United States Patent [19]

Scott

[11] 4,415,880
[45] Nov. 15, 1983

[54] CHARACTER RECOGNITION METHOD AND APPARATUS

[75] Inventor: Warner C. Scott, Dallas, Tex.

[73] Assignee: Texas Instruments Incorporated, Dallas, Tex.

[21] Appl. No.: 115,986

[22] Filed: Jan. 28, 1980

[51] Int. Cl.³ .............................................. G06K 9/46
[52] U.S. Cl. ......................................... 382/27; 382/56
[58] Field of Search ............. 340/146.3 MA, 146.3 H, 340/146.3 AC, 146.3 Q, 146.3 R; 364/515

[56] References Cited

U.S. PATENT DOCUMENTS

| | | | |
|---|---|---|---|
| 3,781,799 | 12/1973 | Robinson | 340/146.3 MA |
| 3,967,243 | 6/1976 | Kawa | 340/146.3 H |
| 4,120,049 | 10/1978 | Thaler et al. | 340/146.3 MA |
| 4,122,443 | 10/1978 | Thaler et al. | 340/146.3 MA |
| 4,130,819 | 12/1978 | Engelmann | 340/146.3 AC |
| 4,138,662 | 2/1979 | Shimoyama | 340/146.3 MA |
| 4,153,897 | 5/1979 | Yasuda et al. | 340/146.3 Q |

*Primary Examiner*—Leo H. Boudreau
*Attorney, Agent, or Firm*—Thomas G. Devine; Melvin Sharp; James T. Comfort

[57] ABSTRACT

A character recognition circuit is provided with the image of unknown characters, in an accessible memory. A microprocessor directs a microcontroller to access the memory and to perform pixel counting, transition recognition and pattern finding. The microprocessor directs such operations and effectively locates lines of unknown characters, deskews those lines if necessary, roughly identifies each unknown character by forming a window around the character and counting pixels inwardly from the top and bottom and from each side until a transition is reached from white (0) to black (1), and from that information as weighted and combined, categorizing the unknown character to be of a particular set of known characters. By comparing the unknown character with the possible known characters, the unknown character is positively identified and stored in a random access memory until the entire message is assembled. Then the message is sent to a buffer unit for ultimate transmission.

17 Claims, 31 Drawing Figures

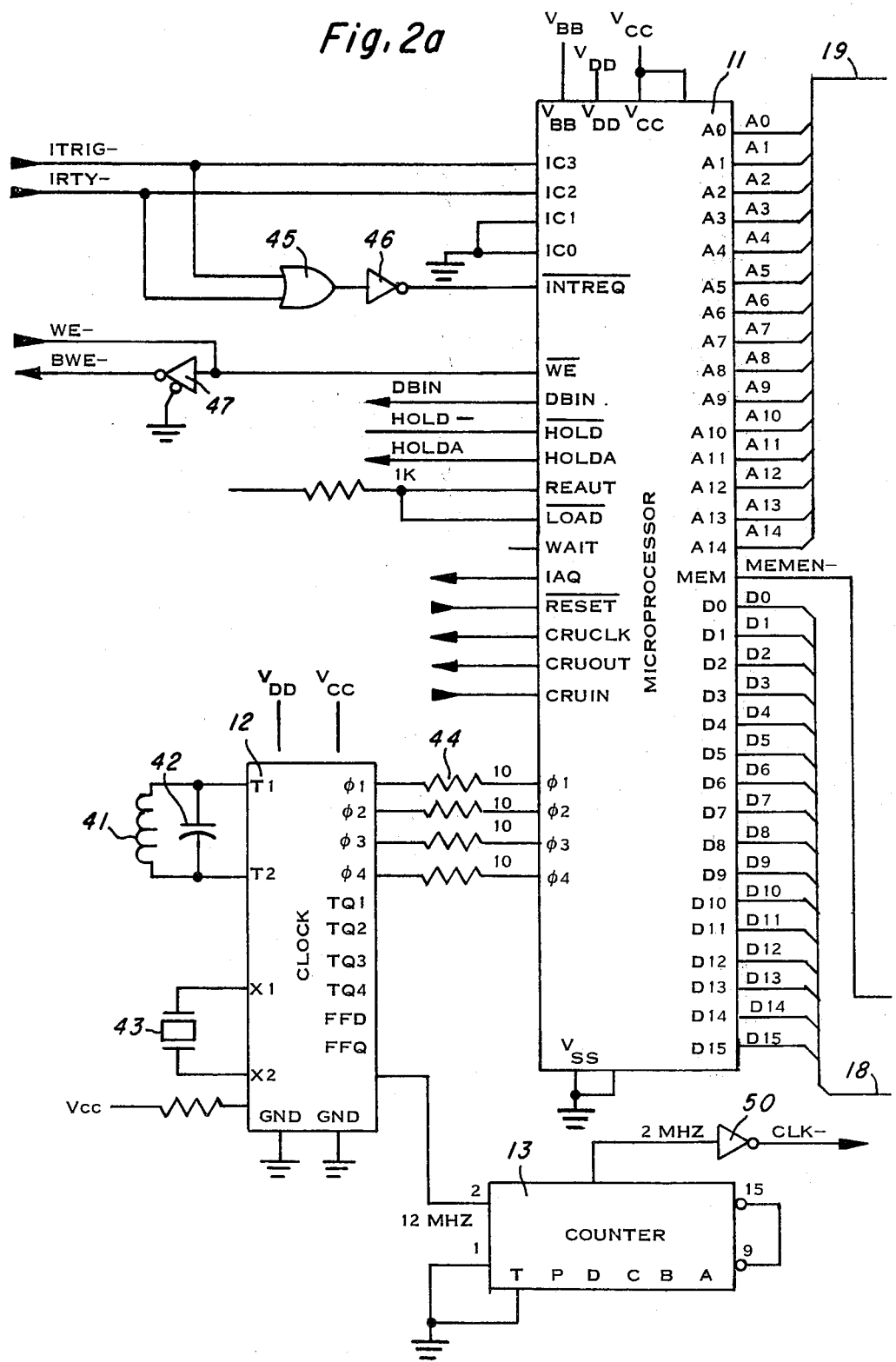

Fig. 7a

```
1D14 ECAL  AO   00B0 00C0 80B8 00B8 A8B8 50B8 F8B8 A0B8 48B8 F07F
8498 8540 85E8 8690 8738 87E0 8888 8930 89D8 8A80 8B28 8BD0 8C78
8D20 8DC8 8E70 8F18 8FC0 9068 9110 91B8 9260 9308 93B0 9458 9500
95A8 9650 96F8 97A0 9848 98F0 9998 9A40 9AE8 9B90 9C38 9CE0 9D88
9E30 9ED8 9F80 A028 A0D0 A178 A220 A2C8 A370 A418 A4C0 A568 A610
A6B8 A760 A808 A8B0 A958 AA00 AAA8 AB50 ABF8 ACA0 AD48 ADF0 AE98
AF40 AFE8 B090 B138 B1E0 B288 B330 B3D8 B480 B528 B5D0 B678 B720
B7C8 B870 B918 B9C0 BA68 BB10 BBB8 BC60 BD08 BDB0 BE58 BF00 BFA8
C050 C0F8 C1A0 C248 C2F0 C398 C440 C4E8 C590 C638 C6E0 C788 C830
C8D8 C980 CA28 CAD0 CB78 CC20 CCC8 CD70 CE18 CEC0 CF68 D010 D0B8
D160 D208 D2B0 D358 D400 D4A8 D550 D5F8 D6A0 D748 D7F0 D898 D940
D9E8 DA90 DB38 DBE0 DC88 DD30 DDD8 2120 1100 1200 1500 1600 0200
0204 0205 0206 0209 020C 0212 0224 0290 0100 0500 0600 00A7 0010
0008 001A 0003 000A 000E 0009 000B 001C 0000 0001 0003 0006 000A
000F 0015 001C 0024 002D 0037 0042 004E 005B 0069 0078 0000 0001
0002 0003 0005 0007 000A 000D 0011 0015 0019 001E 0024 002A 0030
0037 090B 0D0F 0D0F 1114 1115 181C 1519 1E24 0101 0203 0304 FF00
01E0 0794 2931 3233 3435 3637 3839 3041 4344 4D4E 5052 5558 593E
2F24 223F 0400 01D2 4641 494C 2020 544F 2020 5245 4144 0000 4F55
5420 204F 4620 2052 414E 4745 0000 0005 0005 0005 0009 0005 0005
0005 0005 0005 0005 000A 000A 000A 000A 000A 0005 000A 0005 000A
000A 0005 000A 0005 000A 0007 0007 0007 0009 0007 000F 0007 0007
000F 0007 0008 0008 0008 000A 0007 0008 000C 0007 0009 000A 000A
0009 0009 0003 000F 0013 0012 0021 0011 0022 000B 0015 0022 0014
0022 001A 0026 0036 0028 0013 004B 0011 0022 001E 0012 0012 0015
0012 0100 0000 0000 0101 0000 0000 0001 0101 0101 0101 0100 0000
0000 0001 0000 0000 0101 0101 0000 0101 0101 0101 0100 0001 0000
0000 0100 0001 0100 0001 0000 0101 0101 0100 0001 0100 0000 0000
0101 0000 0100 0001 0100 0001 0000 0101 0000 0100 0001 0101 0101
0101 0101 0101 0101 0100 0000 0101 0101 0101 0000 0000 0000 0000
0100 0000 0000 0000 0001 0000 0000 0000 0000 0100 0000 0000 0000
0001 0000 0000 0101 0101 0101 0101 0001 0101 0101 0101 0100 0000
0000 0100 0000 0000 0000 0000 0101 0101 0100 0001 0100 0001 0000
0101 0000 0100 0001 0100 0001 0101 0101 0101 0101 0101 0101 0101
0101 0101 0000 0000 0000 0000 0101 0000 0001 0100 0000 0000 0000
0001 0100 0000 0101 0000 0000 0000 0000 0101 0000 0001 0100 0000
0000 0000 0001 0101 0101 0101 0100 0000 0000 0001 0000 0001 0000
0100 0000 0101 0101 0000 0100 0000 0101 0100 0000 0000 0000 0101
0101 0101 0101 0000 0101 0000 0100 0001 0101 0101 0000 0100 0000
0101 0101 0101 0101 0101 0100 0000 0000 0000 0001 0100 0000 0101
0000 0000 0000 0000 0101 0000 0001 0100 0000 0000 0001 0100
0000 0101 0000 0000 0000 0000 0101 0101 0101 0101 0101 0101 0101
0101 0101 0101 0101 0100 0000 0000 0101 0000 0000 0001 0100 0000
0000 0101 0101 0101 0101 0101 0000 0000 0000 0001 0000 0000 0001 0101
0000 0001 0100 0100 0001 0101 0101 0000 0101 0100 0001 0000 0101
0100 0001 0000 0001 0101 0101 0000 0000 0001 0101 0100 0000 0000
0001 0101 0000 0000 0000 0001 0000 0001 0100 0000 0000 0101 0101
0000 0001 0100 0001 0100 0101 0000 0000 0101 0100 0000 0000 0001
0100 0000 0000 0001 0100 0000 0000 0001 0100 0000 0000 0001 0100
0000 0000 0001 0100 0000 0000 0001 0100 0000 0000 0001 0100 0000
0000 0001 0101 0101 0101 0101 0101 0101 0101 0100 0000 0000
0001 0100 0000 0000 0001 0101 0000 0000 0101 0001 0100 0001 0100
0000 0101 0101 0000 0000 0001 0100 0000 0101 0101 0101 0101 0101
0101 0101 0101 0101 0101 0101 0000 0000 0000 0000 0001 0100 0000
0000 0000 0000 0101 0100 0000 0000 0000 0101 0100 0000 0000 0001
0100 0000 0000 0000 0101 0000 0000 0000 0000 0101 0101 0101 0101
0101 0101 0101 0101 0101 0101 0101 0101 0101 0101 0101 0101 0101
0101 0000 0000 0000 0101 0000 0000 0000 0101 0000 0000 0000 0101
0000 0000 0000 0101 0000 0000 0000 0101 0101 0101 0101 0101 0101
0101 0101 0101 0101 0101 0101 0100 0000 0100 0000 0100 0000 0100
0000 0100 0000 0100 0000 0101 0101 0100 0000 0101 0101 0101 0101
0101 0101 0101 0101 0101 0101 0101 0101 0101 0000 0101 0000 0000
0000 0101 0000 0101 0000 0000 0000 0101 0000 0101 0100 0000 0000
```

Fig. 7b

```
0101 0000 0101 0101 0000 0000 0101 0000 0101 0101 0101 0000 0101
0000 0101 0000 0101 0100 0101 0101 0101 0000 0001 0101 0101 0101
0101 0000 0000 0101 0101 0101 0101 0100 0000 0000 0001 0000 0000
0000 0100 0000 0000 0001 0101 0101 0101 0101 0000 0000 0000 0001
0101 0000 0000 0001 0100 0101 0000 0001 0100 0000 0101 0001 0100
0000 0000 0101 0100 0000 0000 0001 0101 0000 0000 0001 0100 0101
0000 0001 0100 0000 0101 0001 0100 0000 0000 0101 0100 0000 0000
0000 0101 0100 0000 0000 0000 0001 0101 0000 0000 0000 0000 0001
0100 0000 0000 0000 0000 0101 0000 0000 0000 0000 0001 0101 0101
0100 0000 0001 0101 0101 0100 0000 0101 0000 0000 0000 0001 0100
0000 0000 0001 0101 0000 0000 0000 0001 0100 0000 0000 0000 0001
0100 0000 0000 0001 0100 0101 0000 0000 0101 0000 0001 0100 0001
0100 0000 0000 0101 0101 0000 0000 0000 0001 0100 0000 0000 0000
0000 0000 0001 0000 0000 0000 0001 0100 0000 0000 0000 0001 0000
0000 0001 0100 0000 0000 0001 0100 0000 0000 0001 0100 0000 0000
0001 0100 0000 0000 0001 0100 0000 0000 0001 0100 0000 0000 0000
0100 0000 0000 0000 0000 0001 0101 0001 0000 0000 0100 0100 0100
0001 0101 0001 0001 0101 0000 0100 0100 0100 0000 0001 0001 0101
0000 0100 0001 0101 0101 0101 0000 0100 0001 0000 0100 0001 0101
0101 0101 0000 0282 02A5 02C8 02EB 033C 035F 03AA 03CD 03F0 043B
045E 04AE 04FE 054E 0582 05F8 0620 0698 06BB 0715 0779 07AB 0805
0832 C820 0146 1C30 C820 0146 1C32 C820 0146 1C3C 0207 0000 04C6
04C4 C807 0000 C820 0124 0000 D820 0000 08A6 1607 0227 0000 0586
0286 008A 151D 10F0 C220 089C 6207 C908 1C60 C906 1CB0 0228 FFF8
8808 1C30 1404 C808 1C30 C806 1C32 05C4 8804 014C 1508 A1A0 014E
0286 008F 1503 0227 01F8 10D4 0202 0005 8804 0148 1502 0460 099E
0644 C0C4 0644 0201 0012 04E1 1CFE 0641 15FC 04C5 04C7 05C5 8105
1526 C185 05C6 80C6 15F9 C226 1CAF 6225 1CAF 0288 000C 11F6 C266
1C5F 6265 1C5F C2C9 1309 1501 0749 0201 0018 3A41 3E48 C2CB 1501
0509 A242 C249 11E4 13E3 0289 0009 15E0 A249 05A9 1CFE 0587 10DB
8807 014A 111F 0917 04C8 04C9 04C5 0589 C0C9 A0C3 A223 1CFE 81C8
12F9 6242 0605 04E0 1C34 0749 1104 1303 05A0 1C34 05C5 C809 1C36
100E 0201 0000 0202 01D2 CC72 16FE 0380 0201 09A0 0202 01E2 CC72
16FE 0380 C0E0 1C30 020C 0030 C109 1322 0A24 C1A0 0146 6184 C0A0
1C34 1608 0207 008F 61E0 1C32 39C9 3DC1 60C7 1006 C1E0 1C32 39C9
3DC1 60C7 04C4 0649 1105 1306 0609 1306 0460 0C72 0460 0B16 0460
0B8E 0460 0C00 C060 0004 A043 C801 08BC C820 013E 08A2 C020 0000
0280 000A 1506 0581 0583 8803 0146 11F1 0380 C243 C089 0222 000F
8802 0146 1104 C2A0 0146 6283 1002 020A 000F E2A0 0140 04C7 C801
0A12 C80A 0A18 C020 0A1C 1607 0587 0287 008F 154C 0221 08AE 10F2
0600 1515 0587 0287 008F 1543 0221 0A68 C801 0A52 C80A 0A56 C020
0A5A 1607 0587 0287 008F 1536 0221 0A7A 10DC 0607 C807 1C40 61E0
1C3C 1105 0227 FFF4 1102 058C 10FB 0420 0DF8 C1E0 1C38 0287 0007
1115 C060 1C3A 0281 000A 110C 0281 000F 1509 0420 11DA 0420 13FE
0420 1676 DB20 1C5E 09AE 058C C820 1C42 1C3C C1E0 1C42 0587 0287
008F 1506 C047 A041 C061 0004 A043 10A9 024C 00F0 022C FFF0 A0E0
0158 8803 0146 1402 0460 0A0A 0380 C060 0004 A043 A044 C801 0A7E
C820 013A 0A82 C0A0 0A86 0282 000A 151F 0207 0012 A805 0B20 C820
013C 0B26 A0A0 0B2A 0282 000A 1513 0227 0024 0287 007E 11F1 A805
0B38 C820 013A 0B3E A0A0 0B42 0282 000A 1504 0583 8183 11D4 0380
0202 0012 0208 0024 06A0 0CE4 024C 00F0 022C FFF0 A0E0 0158 8183
11C5 0380 C060 0004 A043 A044 C801 0B56 C820 0136 0B5C C0A0 0B60
0207 0009 A805 0B98 C820 013A 0B9E A0A0 0BA2 0282 000A 1513 0227
0012 0287 0087 11F1 A805 0BAA C820 0136 0BB0 A0A0 0BB4 0282 000A
1504 0583 8183 11D7 0380 0202 0009 0208 0012 06A0 0CE4 024C 00F0
022C FFF0 A0E0 0158 8183 11C8 0380 C060 0004 A043 A044 C801 0BC8
C820 0134 0BCE C0A0 0BD2 0207 0006 A805 0C0A C820 0138 0C10 A0A0
0C14 0282 000A 1513 0227 000C 0287 008A 11F1 A805 0C1C C820 0134
0C22 A0A0 0C26 0282 000A 1504 0583 8183 11D7 0380 0202 0006 0208
000C 06A0 0CE4 024C 00F0 022C FFF0 A0E0 0158 8183 11C8 0380 C060
0004 A043 A044 C801 0C3A C820 0130 0C40 C0A0 0C44 0207 0004 A805
0C7C C820 0136 0C82 A0A0 0C86 0282 000A 1513 0227 0009 0287 008B
```

Fig. 7c

```
11F1 A805 OC8E C820 0132 0C94 A0A0 0C98 0282 000A 1504 0583 8183
11D7 0380 0202 0004 0208 0009 06A0 0CE4 024C 00F0 022C FFF0 A0E0
0158 8183 11C8 0380 C243 A244 04C7 C060 0004 A049 C009 0220 000F
8800 0146 1104 C2A0 0146 6289 1002 020A 000F E2A0 0140 C801 0CAC
C80A 0CB2 C020 0CB6 160C 0587 0287 008F 156A 0221 0A94 0602 15F1
A245 A045 C088 10ED 0600 151F 0587 0287 008F 155C 0221 0D24 0602
1503 A245 A045 C088 C801 0D0E C80A 0D12 C020 0D16 150C 0587 0287
008F 154A 0221 0D40 0602 15D1 A245 A045 C202 10CD 0607 C807 1C40
61E0 1C3C 1105 0227 FFF4 1102 058C 10FB 0420 0DF8 C1E0 1C38 0287
0007 111F C060 1C3A 0281 000A 1116 0281 000F 1513 C020 1C36 A000
A020 1C3A 0280 0010 1102 0420 0F40 0420 11DA 0420 13FE 0420 1676
DB20 1C5E 0ADC 058C C820 1C42 1C3C C1E0 1C42 0587 0287 008F 150B
C047 A041 C061 0004 60A0 1C38 1502 A245 C088 0460 0CEE 045B 0000
0DFC C1E0 1C40 C04D 0221 0012 C271 C291 C0CA 0243 00FF A0C3 C087
A082 C062 0004 A049 0208 0001 0587 0287 008F 152E 0588 0221 0D64
C801 0D4E C80A 0D52 C020 0D56 1617 8808 0154 1102 0607 1021 0587
0287 008F 151B 0588 0221 0E2C C801 0E30 C80A 0E34 C020 0E38 0280
0002 14DD 0647 100F 8808 0154 11D8 8808 0156 1505 80C0 14D3 C0C0
C107 10D0 C1C4 1002 0207 008F C807 1C42 61E0 1C40 0587 C807 1C38
0287 0007 1151 0229 0012 8809 0146 1102 C260 0146 C060 1C40 A041
C061 0004 A049 E1E0 012E C801 0E56 C807 0E5A C020 0E5E 1603 0601
0609 10F6 0600 150E 0609 0601 C801 0EBC C807 0EC0 C020 0EC4 1603
0609 0601 10E8 0589 0581 C809 1C44 0229 FFEE 0221 FFEE C801 0ED8
C807 0EDC C020 0EE0 1603 0589 0581 10F6 0600 150D 0589 0581 C801
0EFC C807 0F00 C020 0F04 1603 0589 0581 10E8 0609 C809 1C46 C820
1C44 1C3A 6809 1C3A 05A0 1C3A 0380 0000 0F44 C01D C1E0 1C40 1602
0460 1096 0204 000C 04C3 3CE0 1C36 0583 C220 1C42 C287 A28A C2AA
0004 C120 1C44 C160 1C46 0280 0014 140F 0206 0001 C020 1C34 1603
A143 A284 1002 6103 A284 8144 1133 060A 0604 10FB 0287 0002 1502
0460 1096 C0A0 1C36 A082 0502 0222 0013 C020 1C34 1605 0206 0002
A085 A284 1006 0206 0001 C144 6103 6142 A284 06A0 1186 060A 0604
8144 14FA C160 1C46 C020 1C34 1601 A143 8144 1109 0506 0226 0003
06A0 1186 060A 0604 8144 14FA 0607 C047 A041 C061 0004 A060 1C46
C801 0F18 C0A0 1C3A E0A0 0140 C802 0F1C C020 0F20 1604 0587 0221
0E52 10F1 0600 150F 0587 0221 101C C801 1004 C802 1010 C020 1014
1504 0587 0221 1028 10E1 0607 C807 1C40 C048 A041 C061 0004 A060
1C46 C801 102C C802 1030 C020 1034 1604 0608 0221 FF58 10F5 0600
150F 0608 0221 FF58 C801 1054 C802 1058 C020 105C 1504 0608 0221
FF58 10E5 0588 C808 1C42 6207 0588 C808 1C38 C020 1C36 C080 A000
A002 A008 0280 0010 1501 0380 C220 1C46 8808 0146 1601 0380 04C3
0204 0012 3CC2 0583 C120 1C40 C160 1C42 C1E0 1C44 C220 1C46 C020
1C34 1602 6143 1001 A103 C284 A28A C2AA 0004 A288 06A0 11C2 022A
103C 0584 8144 12F9 C060 1C40 A041 C061 0004 C281 0608 A048 C801
1074 C0A0 1C38 E0A0 012E C802 1078 C020 107C 1603 0588 0581 10F2
0600 150D 0588 0581 C801 1106 C802 1112 C020 1116 1603 0588 0581
10E4 0608 C808 1C46 C04A A047 C801 112A C802 112E C020 1132 1603
0607 0601 10F6 0600 150D 0607 0601 C801 1148 C802 114C C020 1150
1603 0607 0601 10E8 0587 C807 1C44 61C8 0587 C807 1C3A 0380 C04A
C247 C006 0600 150B D851 FF58 0221 10EC 0589 8209 12F9 D860 01B1
FF58 045B D851 FEB0 0221 1196 0589 8209 12F9 D860 01B1 FEB0 D860
01B1 FF58 045B C04A C248 D851 FFFF 0581 0589 81C9 12FA D860 01B1
FFFF 045B 0F40 11DE C0E0 1C40 C120 1C42 C160 1C44 C1A0 1C46 C043
A041 C061 0004 0586 A046 04C7 D091 1307 06A0 1352 1303 9220 01B4
1601 D447 0581 0586 8146 11F3 0583 0221 11AC D091 1307 06A0 13D2
1303 9220 01B5 1601 D447 0583 8103 11F2 C0E0 1C40 C1A0 1C46 0605
0221 00A7 D091 1307 06A0 137C 1303 9220 01B3 1601 D447 0601 0605
8146 11F3 0604 0221 FF58 D091 1307 06A0 13A8 1303 9220 01B6 1601
D447 0604 8103 11F2 C0A0 1C3A E0A0 0140 0221 FF58 C801 1164 C802
1168 C020 116C 1507 05A0 1C40 0221 121A 0620 1C38 10F2 C060 1288
C0E0 1C38 E0E0 012E 0601 C801 12A4 C803 128C C020 1290 1505 0620
1C44 0620 1C3A 10F3 C060 12B2 C0A0 1C3A E0A0 0142 0221 FF58 C801
12CA C802 12B6 C020 12BA 1505 0620 1C42 0620 1C38 10F2 C060 12DA
```

Fig. 7d

```
COEO 1C38 EOEO 0144 0581 C801 12F2 C803 12DE C020 12E2 1505 05A0
1C46 0620 1C3A 10F3 COEO 1C38 04E0 1C50 COAO 1C3A EOAO 0140 C060
1300 0221 129A C801 1328 C802 1304 A820 1308 1C50 0603 15F5 04E0
1C4C COAO 1C38 38A0 1C3A C803 1C4C 0380 04C8 D261 FFFF F209 A208
D261 0001 F209 A208 D261 00A7 F209 A208 D261 00A8 F209 A208 D261
00A9 F209 045B 04C8 D261 FF57 F209 A208 D261 FF58 F209 A208 D261
FF59 F209 A208 D261 FFFF F209 A208 D261 0001 F209 0A38 045B 04C8
D261 FF58 F209 A208 D261 FF59 F209 0A28 D261 0001 F209 0A28 D261
00A8 F209 A208 D261 00A9 F209 045B 04C8 D261 FF57 F209 A208 D261
FF58 F209 0A28 D261 FFFF F209 0A28 D261 00A7 F209 A208 D261 00A8
F209 A208 045B 11DA 1402 0201 001E 04E1 1CBO 0641 15FC 13FB 020A
1CBO COEO 1C3A C103 C143 0583 0913 0603 0914 C185 0645 C060 1C40
A041 C821 0004 1C58 A820 1C46 1C58 COAO 1C42 A082 C822 0004 1C5A
A820 1C46 1C5A C1EO 1C38 C047 C007 0607 A1C7 C1E7 015A EO60 0128
E020 012C 0606 C820 1C58 1330 A806 145A C801 1334 COAO 1338 A082
COA2 015A 81C2 1115 0288 0015 1512 C820 1C58 146E A806 148C 0620
1490 C801 1472 C320 1476 1307 A30C C32C 015A 028C 0015 1101 C202
C820 1C5A 1494 A806 14B2 C800 1498 COAO 149C A082 COA2 015A 81C2
1115 0289 0015 1512 C820 1C5A 14B6 A806 14D4 0620 14D8 C800 14BA
C320 14BE 1307 A30C C32C 015A 028C 0015 1101 C242 8146 110A 1504
AA88 0010 AA89 0004 AA88 0012 AA89 0002 1023 0286 0001 150C AA88
000E AA89 0006 0286 0001 1119 AA88 0010 AA89 0004 1014 AA88 0010
AA88 001C AA89 0004 AA88 0018 8106 1104 AA88 0012 AA89 0002 80C6
1504 AA88 000E AA89 0006 0606 1587 1386 0204 0003 022A 0002 0205
0003 CODA 1304 A0C3 04C2 3C84 C682 05CA 0605 16F7 022A 0006 0205
0003 CODA 1304 A0C3 04C2 3C84 C682 05CA 0605 16F7 022A 0004 CODA
1304 04C2 A0C3 3C84 CE82 05CA CODA 1304 A0C3 04C2 3C84 C682 020A
1CBO COEO 1C38 C103 C143 0583 0913 0603 0914 C185 0645 0606 C2EO
1C58 C30B C1EO 1C3A C047 C007 E060 012A E020 0126 0607 A307 C80C
14DC C801 14E0 COAO 14E4 A082 C222 017A C80B 15E6 C800 15EA COAO
15EE A082 C262 017A 8146 110A 1504 AA88 0016 AA89 000A AA88 0014
AA89 000C 1023 0286 0001 150C AA88 0000 AA89 0008 0286 0001 1119
AA88 0016 AA89 000A 1014 AA88 0016 AA88 001E AA89 000A AA89 001A
8106 1104 AA88 0014 AA89 000C 80C6 1504 AA88 0000 AA89 0008 022B
132C 022C 1668 0606 15B9 13B8 0380 13FE 167A C22A 0004 A22A 000A
A22A 0010 A22A 0016 0203 0001 0204 0008 8108 1A06 0583 0283 0006
1302 A104 10F8 0603 1508 0205 FFFF 0206 FEF3 0207 3FFF 0460 185A
0603 1507 0205 EFFE 0206 FCE3 0207 3FFF 1021 0603 1507 0205 CECC
0206 8CCB 0207 3FBF 1018 0603 1507 0205 CC88 0206 048F 0207 3C00
100F 0603 1507 0205 C002 0206 020C 0207 8000 1006 0205 D333 0206
A33C 0207 C040 C220 1C38 C260 1C3A 0228 FFFA 0229 FFF7 D269 01A9
06C9 0249 00FF C089 0602 0A22 C048 0601 0A21 A049 A088 DOE2 0199
06C3 0243 00FF D121 0199 06C4 00FF C06A 001A C241 A249 A241
C22A 000A 8248 1A01 C201 80C8 1B0C 0265 0840 0266 0C03 0267 2000
0288 0004 1409 0266 0030 1006 0265 101C 0266 035C 0267 CF3F C06A
001C C241 A249 A241 C22A 0010 8248 1A01 C201 8108 1B07 0265 0A00
0266 0003 0267 3030 1006 0265 000F 0266 FDDC 0267 CC00 C06A 001E
C241 A249 A241 C22A 0016 8248 1A01 C201 80C8 1B05 0265 080C 0267
0C42 1006 0265 1013 0266 CB5F 0267 B33C C06A 0018 C241 A249 A241
C22A 0004 8248 1A01 C201 8108 1B07 0265 0800 0266 00C0 0267 0C00
1006 0265 020E 0266 3F1F 0267 COFO C22A 0006 A22A 0012 0288 0010
1A03 0267 00C0 1006 0265 0F00 0266 COCO 0267 303C C22A 0004 A22A
0010 0288 0008 1A05 0265 0008 0266 2808 1006 0265 1FFO 0266 40E3
0267 7F3F C22A 0000 A22A 0014 C26A 0008 A26A 000C 8248 1A07 0265
00C1 0266 CC03 0267 3000 1006 0265 000C 0266 0020 0267 CC02 C22A
0006 A22A 0012 C26A 0002 A26A 000E 8248 1A12 6209 0288 002C 1B07
0265 2800 0266 0003 0267 OFCB 1018 0265 32AA 0266 2B6B 0267 CFE3
1011 6248 0289 002C 1B07 0265 0C00 0266 C003 0267 1E0C 1006 0265
0EAA 0266 EB69 0267 F02C C22A 0010 C26A 0004 8248 1A12 6209 0288
002C 1B07 0265 0002 0266 COC2 0267 0C00 1018 0265 3BFF 0266 FFFC
0267 CD4A 1011 6248 0289 002C 1B07 0265 0200 0266 00C3 0267 3BB0
1006 0265 3BFF 0266 3F3F 0267 F3FA C22A 000A C26A 0016 8248 1A12
```

Fig. 7e

```
6209 0288 002C 1B07 0265 000C 0266 0800 0267 0C03 1018 0265 3B3E
0266 33BC 0267 CFFF 1011 6248 0289 002C 1B07 0265 008E 0266 CC03
0267 3000 1006 0265 3BF3 0266 FFAF 0267 F3FC C22A 0010 A22A 0016
0288 000C 1503 0265 0030 1002 0265 0003 04C1 04C3 04C4 C087 0242
0003 C842 1CB0 04E1 1C60 0642 1504 1102 0584 1001 0583 05C1 0B27
0281 000E 12EE C086 0242 0003 C842 1CB0 04E1 1C60 0642 1504 1102
0584 1001 0583 05C1 0B26 0281 001E 12EE C085 0242 0003 C842 1CB0
04E1 1C60 0642 1504 1102 0584 1001 0583 05C1 0B25 0281 002E 12EE
0205 0001 0206 0002 8143 1111 1521 04C1 8161 1CB0 1202 05C1 10FB
0420 1AFE C0A1 1C60 0282 0060 125A C846 1CB0 0584 8144 115A 152F
04C1 81A1 1CB0 1302 05C1 10FB 0420 1AFE C0A1 1C60 0282 0060 1147
104B 0208 0100 020A 0100 04C9 04C1 8161 1CB0 150F 0420 1AFE C0A1
1C60 82C2 1405 C288 C202 C2C9 C241 1004 8282 1402 C282 C2C1 05C1
0281 002E 12EA 0288 0060 1222 C104 1320 0208 0100 020A 0100 04C9
04C1 81A1 1CB0 1510 1102 0420 1AFE C0A1 1C60 8202 1405 C288 C202
C2C9 C241 1004 8282 1402 C282 C2C1 05C1 0281 002E 12E9 0288 0060
1505 6288 022A FFE0 1106 C049 0911 D821 01B7 1C5E 0380 D820 01CF
1C5E 0380 0000 1B02 C30D 05CC C2DC C220 1C50 C82B 01F2 1C3C C82B
0222 1C3E C0A0 1C3C 38A0 1C3E C160 1C4C C1AB 0252 3985 3A03 38C5
C804 1C56 6107 6109 0744 6804 1C56 6247 0749 C809 1C54 C82B 0850
1C4A C820 1C58 1C48 C1A0 1C3A A806 1C48 0620 1C48 04C3 0208 0001
04C4 C160 1C3E C1C5 0420 1BD0 8185 1515 C045 6044 3840 A0C2 8185
1107 81C8 131A C105 A147 0620 1C48 100D C105 A160 1C3E 0620 1C48
0420 1BD0 10E9 C046 6044 3840 A0C2 C106 A1A0 1C3A 0588 05A0 1C4A
0420 1BD0 10DC 0202 0100 60E0 1C54 3883 C020 1C56 6020 1C54 3C80
CAC2 1C60 0380 0DF8 1BD4 04C3 04C4 C160 1C3C C1C5 C1A0 1C38 0208
0001 C2A0 1C4A C260 1C48 8185 1512 9699 1302 A0C5 60C4 8185 1107
81C8 1315 C105 A147 0229 166C 100A C105 A147 0229 1C08 10EC 9699
1302 A0C6 60C4 C106 A1A0 1C38 0588 A2A0 1C3E 10E1 C743 0380 1C30
1C32 1C34 1C36 1C38 1C3A 1C3C 1C3E 1C40 1C42 1C44 1C46 1C48 1C4A
1C4C 1C4E 1C50 1C52 1C54 1C56 1C58 1C5A 1C5C 1C5E 1C60 1CB0 1D00
0000 LGWP 31BD ALGW 1316 6ALG P231 FEAL WP34 000C KOFF F22A
0000 LKDN 4000 CLKP T308 4IMG RY40 00MA COL3 C12M XROW F209
0000 ECAL 30DC TGDA A400 OTPR TV31 F8UA DR 3 5FCU MD   F232
1600 CNT  308A8UPAT  7FAC7F
     RECALG    12/19/79   11:21:19     SDSMAC 3.2.0 78.274
```

Fig. 7f

```
2334 AIN     AO   00B0 20C0 5AB0 80B0 00B0 00B0 E0BF 00B0 0CB0 007F
1D00 1E0F 1D0F 1E00 020C 0220 04C0 3200 020C 0230 3100 020C 0200
1D1C 1D1E 0200 0000 0201 FF02 CC70 CC70 C450 020C 0200 1D01 1D04
020C 0100 1E00 1D08 0420 228E 0300 000F 0460 0080 F800 005E 02E0
F800 020C 0200 1F04 164A 1D01 0200 2020 0201 FE00 0202 FE40 CC40
8081 16FD 0200 0007 0420 1E84 0200 0001 0420 1FB4 2FA0 011C 020C
0080 1F15 1309 0200 8000 0201 A890 0202 0020 0420 2102 10F3 04C0
3600 1E12 0280 5900 161E 0420 2044 0200 0000 0420 0160 0420 207C
0420 20A2 0200 0004 0420 1FB4 2FA0 014A 020C 0080 1F15 1309 0200
8000 0201 A890 0202 0020 0420 2102 10F3 1E12 020C 0200 1F01 16FC
100B 1D04 0200 0000 0420 0160 0200 0000 0420 1FB4 1F04 16FE 0300
000F 0460 0080 2054 4F20 434F 4E54 494E 5545 2045 4E54 4552 2027
5927 2C20 544F 2041 424F 5254 2045 4E54 4552 2027 4127 0D0A 0700
2054 4F20 4558 4954 2045 4E54 4552 2027 4527 0D0A 0700 F820 09E0
8000 80A8 8150 81F8 82A0 8348 83F0 8498 8540 85E8 8690 8738 87E0
8888 8930 89D8 8A80 8B28 8BD0 8C78 8D20 8DC8 8E70 8F18 8FC0 9068
9110 91B8 9260 9308 93B0 9458 9500 95A8 9650 96F8 97A0 9848 98F0
9998 9A40 9AE8 9B90 9C38 9CE0 9D88 9E30 9ED8 9F80 A028 A0D0 A178
A220 A2C8 A370 A418 A4C0 A568 A610 A6B8 A760 A808 A8B0 A958 AA00
AAA8 AB50 ABF8 ACA0 AD48 ADF0 AE98 AF40 AFE8 B090 B138 B1E0 B288
B330 B3D8 B480 B528 B5D0 B678 B720 B7C8 B870 B918 B9C0 BA68 BB10
BBB8 BC60 BD08 BDB0 BE58 BF00 BFA8 C050 C0F8 C1A0 C248 C2F0 C398
C440 C4E8 C590 C638 C6E0 C788 C830 C8D8 C980 CA28 CAD0 CB78 CC20
CCC8 CD70 CE18 CEC0 CF68 D010 D0B8 D160 D208 D2B0 D358 D400 D4A8
D550 D5F8 D6A0 D748 D7F0 D898 D940 D9E8 DA90 DB38 DBE0 DC88 DD30
DDD8 2120 1100 1200 1500 1600 0200 0204 0205 0206 0209 020C 0212
0224 0290 0100 0500 0600 00A7 0010 0008 001A 0003 000A 000E 0009
000B 001C 0000 0001 0003 0006 000A 000F 0015 001C 0024 002D 0037
0042 004E 005B 0069 0078 0000 0001 0002 0003 0005 0007 000A 000D
0011 0015 0019 001E 0024 002A 0030 0037 090B 0D0F 0D0F 1114 1115
181C 1519 1E24 0101 0203 0304 FF00 01E0 0794 2931 3233 3435 3637
3839 3041 4344 4D4E 5052 5558 593E 2F24 223F 0400 4641 494C 2020
544F 2020 5245 4144 0000 4F55 5420 204F 4620 2052 414E 4745 0000
0005 0005 0005 0009 0005 0005 0005 0005 0005 0005 000A 000A 000A
000A 000A 0005 000A 0005 000A 000A 0005 000A 0005 000A 0007 0007
0007 0009 0007 0007 0007 0007 000F 0007 0007 0008 0008 000A 0007
0008 000C 0007 0009 000A 000A 0009 0009 0003 000F 0013 0012 0021
0011 0022 000B 0015 0022 0014 0022 001A 0026 0036 0028 0013 004B
0011 0022 001E 0012 0012 0015 0012 0100 0000 0000 0101 0000 0000
0001 0101 0101 0101 0100 0000 0000 0001 0000 0000 0101 0101 0000
0101 0101 0100 0001 0000 0101 0000 0100 0001 0100 0001 0000 0101
0101 0100 0001 0100 0000 0000 0101 0000 0100 0001 0100 0001 0000
0101 0000 0100 0001 0101 0101 0101 0101 0101 0101 0100 0000 0101
0101 0101 0000 0000 0000 0000 0100 0000 0000 0000 0001 0000 0000
0000 0000 0100 0000 0000 0000 0001 0000 0000 0101 0101 0101 0101
0001 0101 0101 0101 0100 0000 0000 0100 0000 0000 0000 0000 0101
0101 0100 0001 0100 0001 0000 0101 0000 0100 0001 0100 0001 0101
0101 0101 0101 0101 0101 0101 0101 0101 0000 0000 0000 0000 0101
0000 0001 0100 0000 0000 0000 0001 0100 0000 0101 0000 0000 0000
0000 0101 0000 0001 0100 0000 0000 0000 0001 0101 0101 0101 0100
0000 0000 0001 0000 0000 0000 0100 0000 0101 0101 0000 0100 0000
0101 0100 0000 0000 0000 0101 0101 0101 0101 0000 0101 0000 0100
0001 0101 0101 0000 0100 0000 0101 0101 0101 0101 0101 0100 0000
0000 0000 0001 0100 0000 0101 0000 0000 0000 0000 0101 0000 0001
0100 0000 0000 0000 0001 0100 0000 0101 0000 0000 0000 0000 0101
0101 0101 0101 0101 0101 0101 0101 0101 0101 0101 0100 0000 0000
0101 0000 0000 0001 0100 0000 0000 0101 0101 0101 0101 0000 0000
0000 0001 0000 0000 0001 0101 0000 0001 0101 0100 0001 0101 0101
0000 0101 0100 0001 0000 0101 0100 0001 0000 0001 0101 0101 0000
0000 0001 0101 0100 0000 0000 0001 0101 0000 0000 0000 0001 0000
0001 0100 0000 0000 0101 0101 0000 0001 0100 0001 0100 0101 0000
0000 0101 0100 0000 0000 0001 0100 0000 0000 0001 0100 0000 0000
```

Fig.7g

```
0001 0100 0000 0000 0001 0100 0000 0000 0001 0100 0000 0000 0001
0100 0000 0000 0001 0100 0000 0000 0001 0101 0101 0101 0101 0101
0101 0101 0101 0100 0000 0000 0001 0100 0000 0000 0001 0101 0000
0000 0101 0001 0100 0001 0100 0000 0101 0101 0000 0000 0001 0100
0000 0101 0101 0101 0101 0101 0101 0101 0101 0101 0101 0101 0000
0000 0000 0000 0001 0100 0000 0000 0000 0000 0101 0100 0000 0000
0000 0101 0100 0000 0000 0001 0100 0000 0000 0000 0101 0000 0000
0000 0000 0101 0101 0101 0101 0101 0101 0101 0101 0101 0101 0101
0101 0101 0101 0101 0101 0101 0101 0000 0000 0000 0101 0000 0000
0000 0101 0000 0000 0000 0101 0000 0000 0000 0101 0000 0000 0000
0101 0101 0101 0101 0101 0101 0101 0101 0101 0101 0101 0101 0100
0000 0100 0000 0100 0000 0100 0000 0100 0000 0100 0000 0101 0101
0100 0000 0101 0101 0101 0101 0101 0101 0101 0101 0101 0101 0101
0101 0101 0000 0101 0000 0000 0000 0101 0000 0101 0000 0000 0000
0101 0000 0101 0100 0000 0000 0101 0000 0101 0101 0000 0000 0101
0000 0101 0101 0101 0000 0101 0000 0101 0000 0101 0100 0101 0101
0101 0000 0001 0101 0101 0101 0101 0000 0000 0101 0101 0101 0101
0100 0000 0000 0001 0000 0000 0000 0100 0000 0000 0001 0101 0101
0101 0101 0000 0000 0000 0001 0101 0000 0000 0001 0100 0101 0000
0001 0100 0000 0101 0001 0100 0000 0000 0101 0100 0000 0000 0001
0101 0000 0000 0001 0100 0101 0000 0001 0100 0000 0101 0001 0100
0000 0000 0101 0100 0000 0000 0000 0101 0100 0000 0000 0000 0001
0101 0000 0000 0000 0000 0001 0100 0000 0000 0000 0000 0101 0000
0000 0000 0000 0001 0101 0101 0100 0000 0001 0101 0101 0100 0000
0101 0000 0000 0000 0001 0100 0000 0000 0001 0101 0000 0000 0000
0001 0100 0000 0000 0000 0001 0100 0000 0000 0001 0100 0101 0000
0000 0101 0000 0001 0100 0001 0100 0000 0000 0101 0101 0000 0000
0000 0001 0100 0000 0000 0000 0000 0000 0001 0000 0000 0000 0001
0100 0000 0000 0001 0100 0000 0000 0001 0100 0000 0000 0001 0100
0000 0000 0001 0100 0000 0000 0001 0100 0000 0000 0001 0100 0000
0000 0001 0100 0000 0000 0000 0100 0000 0000 0000 0000 0001 0101
0001 0000 0000 0100 0100 0100 0001 0101 0001 0001 0101 0000 0100
0100 0100 0000 0001 0001 0101 0000 0100 0001 0101 0101 0101 0000
0100 0001 0000 0100 0001 0101 0101 0101 0000 03E2 0405 0428 044B
049C 04BF 050A 052D 0550 059B 05BE 060E 065E 06AE 0712 0758 0780
07F8 081B 0875 08D9 090B 0965 0992 C820 02A6 1D90 C820 02A6 1D92
C820 02A6 1D9C 0207 8000 04C6 04C4 C807 E002 C820 02B4 E000 D820
E004 E004 1607 0227 00A8 0586 0286 008A 151D 10F0 C220 E002 6207
C908 1DC0 C906 1E10 0228 FFF8 8808 1D90 1404 C808 1D90 C806 1D92
05C4 8804 02AC 1508 A1A0 02AE 0286 008F 1503 0227 01F8 10D4 0202
0005 8804 02A8 1502 0460 0AFE 0644 C0C4 0644 0201 0012 04E1 1E5E
0641 15FC 04C5 04C7 05C5 8105 1526 C185 05C6 80C6 15F9 C226 1E0F
6225 1E0F 0288 000C 11F6 C266 1DBF 6265 1DBF C2C9 1309 1501 0749
0201 0018 3A41 3E48 C2CB 1501 0509 A242 C249 11E4 13E3 0289 0009
15E0 A249 05A9 1E5E 0587 10DB 8807 02AA 111F 0917 04C8 04C9 04C5
0589 C0C9 A0C3 A223 1E5E 81C8 12F9 6242 0605 04E0 1D94 0749 1104
1303 05A0 1D94 05C5 C809 1D96 100E 0201 FE00 0202 0332 CC72 16FE
0380 0201 FE00 0202 0342 CC72 16FE 0380 C0E0 1D90 020C 0030 C109
1322 0A24 C1A0 02A6 6184 C0A0 1D94 1608 0207 008F 61E0 1D92 39C9
3DC1 60C7 1006 C1E0 1D92 39C9 3DC1 60C7 04C4 0649 1105 1306 0609
1306 0460 0DD2 0460 0C76 0460 0CEE 0460 0D60 C060 0164 A043 C801
E002 C820 029E E000 C020 E000 0280 000A 1506 0581 0583 8803 02A6
11F1 0380 C243 C089 0222 000F 8802 02A6 1104 C2A0 02A6 6283 1002
020A 000F E2A0 02A0 04C7 C801 E002 C80A E000 C020 E000 1607 0587
0287 008F 154C 0221 00A8 10F2 0600 1515 0587 0287 008F 1543 0221
00A8 C801 E002 C80A E000 C020 E000 1607 0587 0287 008F 1536 0221
00A8 10DC 0607 C807 1DA0 61E0 1D9C 1105 0227 FFF4 1102 058C 10FB
0420 0F58 C1E0 1D98 0287 0007 1115 C060 1D9A 0281 000A 110C 0281
000F 1509 0420 133A 0420 155E 0420 17D6 DB20 1DBE FE00 058C C820
1DA2 1D9C C1E0 1DA2 0587 0287 008F 1506 C047 A041 C061 0164 A043
10A9 024C 00F0 022C FFF0 A0E0 02B8 8803 02A6 1402 0460 0B6A 0380
C060 0164 A043 A044 C801 E002 C820 029A E000 C0A0 E000 0282 000A
```

Fig. 7h

```
151F: 0207 0012 A805 E002 C820 029C E000 A0A0 E000 0282 000A 1513
0227: 0024 0287 007E 11F1 A805 E002 C820 029A E000 A0A0 E000 0282
000A: 1504 0583 8183 11D4 0380 0202 0012 0208 0024 06A0 0E44 024C
00F0: 022C FFF0 A0E0 02B8 8183 11C5 0380 C060 0164 A043 A044 C801
E002: C820 0296 E000 C0A0 E000 0207 0009 A805 E002 C820 029A E000
A0A0: E000 0282 000A 1513 0227 0012 0287 0087 11F1 A805 E002 C820
0296: E000 A0A0 E000 0282 000A 1504 0583 8183 11D7 0380 0202 0009
0208: 0012 06A0 0E44 024C 00F0 022C FFF0 A0E0 02B8 8183 11C8 0380
C060: 0164 A043 A044 C801 E002 C820 0294 E000 C0A0 E000 0207 0006
A805 E002 C820 0298 E000 A0A0 E000 0282 000A 1513 0227 000C 0287
008A 11F1 A805 E002 C820 0294 E000 A0A0 E000 0282 000A 1504 0583
8183 11D7 0380 0202 0006 0208 000C 06A0 0E44 024C 00F0 022C FFF0
A0E0 02B8 8183 11C8 0380 C060 0164 A043 A044 C801 E002 C820 0290
E000 C0A0 E000 0207 0004 A805 E002 C820 0296 E000 A0A0 E000 0282
000A 1513 0227 0009 0287 008B 11F1 A805 E002 C820 0292 E000 A0A0
E000 0282 000A 1504 0583 8183 11D7 0380 0202 0004 0208 0009 06A0
0E44 024C 00F0 022C FFF0 A0E0 02B8 8183 11C8 0380 C243 A244 04C7
C060 0164 A049 C009 0220 000F 8800 02A6 1104 C2A0 02A6 6289 1002
020A 000F E2A0 02A0 C801 E002 C80A E000 C020 E000 160C 0587 0287
008F 156A 0221 00A8 0602 15F1 A245 A045 C088 10ED 0600 151F 0587
0287 008F 155C 0221 00A8 0602 1503 A245 A045 C088 C801 E002 C80A
E000 C020 E000 150C 0587 0287 008F 154A 0221 00A8 0602 15D1 A245
A045 C202 10CD 0607 C807 1DA0 61E0 1D9C 1105 0227 FFF4 1102 058C
10FB 0420 0F58 C1E0 1D98 0287 0007 111F C060 1D9A 0281 000A 1116
0281 000F 1513 C020 1D96 A000 A020 1D9A 0280 0010 1102 0420 10A0
0420 133A 0420 155E 0420 17D6 DB20 1DBE FE00 058C C820 1DA2 1D9C
C1E0 1DA2 0587 0287 008F 150B C047 A041 C061 0164 60A0 1D98 1502
A245 C088 0460 CE4E 045B F840 0F5C C1E0 1DA0 C04D 0221 0012 C271
C291 C0CA 0243 00FF A0C3 C087 A082 C062 0164 A049 0208 0001 0587
0287 008F 152E 0588 0221 00A8 C801 E002 C80A E000 C020 E000 1617
8808 02B4 1102 0607 1021 0587 0287 008F 151B 0588 0221 00A8 C801
E002 C80A E000 C020 E000 0280 0002 14DD 0647 100F 8808 02B4 11D8
8808 02B6 1505 80C0 14D3 C0C0 C107 10D0 C1C4 1002 0207 008F C807
1DA2 61E0 1DA0 0587 C807 1D98 0287 0007 1151 0229 0012 8809 02A6
1102 C260 02A6 C060 1DA0 A041 C061 0164 A049 E1E0 028E C801 E002
C807 E000 C020 E000 1603 0601 0609 10F6 0600 150E 0609 0601 C801
E002 C807 E000 C020 E000 1603 0609 0601 10E8 0589 0581 C809 1DA4
0229 FFEE 0221 FFEE C801 E002 C807 E000 C020 E000 1603 0589 0581
10F6 0600 150D 0589 0581 C801 E002 C807 E000 C020 E000 1603 0589
0581 10E8 0609 C809 1DA6 C820 1DA4 1D9A 6809 1D9A 05A0 1D9A 0380
F860 10A4 C01D C1E0 1DA0 1602 0460 11F6 0204 000C 04C3 3CE0 1D96
0583 C220 1DA2 C287 A28A C2AA 0164 C120 1DA4 C160 1DA6 0280 0014
140F 0206 0001 C020 1D94 1603 A143 A284 1002 6103 A284 8144 1133
060A 0604 10F8 0287 0002 1502 0460 11F6 C0A0 1D96 A082 0502 0222
0013 C020 1D94 1605 0206 0002 A085 A284 1006 0206 0001 C144 6103
6142 A284 06A0 12E6 060A 0604 8144 14FA C160 1DA6 C020 1D94 1601
A143 8144 1109 0506 0226 0003 06A0 12E6 060A 0604 8144 14FA 0607
C047 A041 C061 0164 A060 1DA6 C801 E002 C0A0 1D9A E0A0 02A0 C802
E000 C020 E000 1604 0587 0221 00A8 10F1 0600 150F 0587 0221 00A8
C801 E002 C802 E000 C020 E000 1504 0587 0221 00A8 10E1 0607 C807
1DA0 C048 A041 C061 0164 A060 1DA6 C801 E002 C802 E000 C020 E000
1604 0608 0221 FF58 10F5 0600 150F 0608 0221 FF58 C801 E002 C802
E000 C020 E000 1504 0608 0221 FF58 10E5 0588 C808 1DA2 6207 0588
C808 1D98 C020 1D96 C080 A000 A002 A008 0280 0010 1501 0380 C220
1DA6 8808 02A6 1601 0380 04C3 0204 0012 3CC2 0583 C120 1DA0 C160
1DA2 C1E0 1DA4 C220 1DA6 C020 1D94 1602 6143 1001 A103 C284 A28A
C2AA 0164 A288 06A0 1322 022A 00A8 0584 8144 12F9 C060 1DA0 A041
C061 0164 C281 0608 A048 C801 E002 C0A0 1D98 E0A0 028E C802 E000
C020 E000 1603 0588 0581 10F2 0600 150D 0588 0581 C801 E002 C802
E000 C020 E000 1603 0588 0581 10E4 0608 C808 1DA6 C04A A047 C801
E002 C802 E000 C020 E000 1603 0607 0601 10F6 0600 150D 0607 0601
C801 E002 C802 E000 C020 E000 1603 0607 0601 10E8 0587 C807 1DA4
```

Fig. 7i

```
61C8 0587 C807 1D9A 0380 C04A C247 C006 0600 150B D851 FF58 0221
00A8 0589 8209 12F9 D860 0311 FF58 045B D851 FEB0 0221 00A8 0589
8209 12F9 D860 0311 FEB0 D860 0311 FF58 045B C04A C248 D851 FFFF
0581 0589 81C9 12FA D860 0311 FFFF 045B F860 133E C0E0 1DA0 C120
1DA2 C160 1DA4 C1A0 1DA6 C043 A041 C061 0164 0586 A046 04C7 D091
1307 06A0 14B2 1303 9220 0314 1601 D447 0581 0586 8146 11F3 0583
0221 00A8 D091 1307 06A0 1532 1303 9220 0315 1601 D447 0583 8103
11F2 C0E0 1DA0 C1A0 1DA6 0605 0221 00A7 D091 1307 06A0 14DC 1303
9220 0313 1601 D447 0601 0605 8146 11F3 0604 0221 FF58 D091 1307
06A0 1508 1303 9220 0316 1601 D447 0604 8103 11F2 C0A0 1D9A E0A0
02A0 0221 FF58 C801 E002 C802 E000 C020 E000 1507 05A0 1DA0 0221
00A8 0620 1D98 10F2 C060 E002 C0E0 1D98 E0E0 028E 0601 C801 E002
C803 E000 C020 E000 1505 0620 1DA4 0620 1D9A 10F3 C060 E002 C0A0
1D9A E0A0 02A2 0221 FF58 C801 E002 C802 E000 C020 E000 1505 0620
1DA2 0620 1D98 10F2 C060 E002 C0E0 1D98 E0E0 02A4 0581 C801 E002
C803 E000 C020 E000 1505 05A0 1DA6 0620 1D9A 10F3 C0E0 1D98 04E0
1DB0 C0A0 1D9A E0A0 02A0 C060 E002 0221 00A8 C801 E002 C802 E000
A820 E000 1DB0 0603 15F5 04E0 1DAC C0A0 1D98 38A0 1D9A C803 1DAC
0380 04C8 D261 FFFF F209 A208 D261 0001 F209 A208 D261 00A7 F209
A208 D261 00A8 F209 A208 D261 00A9 F209 045B 04C8 D261 FF57 F209
A208 D261 FF58 F209 A208 D261 FF59 F209 A208 D261 FFFF F209 A208
D261 0001 F209 0A38 045B 04C8 D261 FF58 F209 A208 D261 FF59 F209
0A28 D261 0001 F209 0A28 D261 00A8 F209 A208 D261 00A9 F209 045B
04C8 D261 FF57 F209 A208 D261 FF58 F209 0A28 D261 FFFF F209 0A28
D261 00A7 F209 A208 D261 00A8 F209 A208 045B F860 1562 0201 001E
04E1 1E10 0641 15FC 13FB 020A 1E10 C0E0 1D9A C103 C143 0583 0913
0603 0914 C185 0645 C060 1DA0 A041 C821 0164 1DB8 A820 1DA6 1DB8
C0A0 1DA2 A082 C822 0164 1DBA A820 1DA6 1DBA C1E0 1D98 C047 C007
0607 A1C7 C1E7 02BA E060 0288 E020 028C 0606 C820 1DB8 E002 A806
E002 C801 E000 C0A0 E000 A082 C0A2 02BA 81C2 1115 0288 0015 1512
C820 1DB8 E002 A806 E002 0620 E002 C801 E000 C320 E000 1307 A30C
C32C 02BA 028C 0015 1101 C202 C820 1DBA E002 A806 E002 C800 E000
C0A0 E000 A082 C0A2 02BA 81C2 1115 0289 0015 1512 C820 1DBA E002
A806 E002 0620 E002 C800 E000 C320 E000 1307 A30C C32C 02BA 028C
0015 1101 C242 8146 110A 1504 AA88 0010 AA89 0004 AA88 0012 AA89
0002 1023 0286 0001 150C AA88 000E AA89 0006 0286 0001 1119 AA88
0010 AA89 0004 1014 AA88 0010 AA88 001C AA89 0004 AA89 0018 8106
1104 AA88 0012 AA89 0002 80C6 1504 AA88 000E AA89 0006 0606 1587
1386 0204 0003 022A 0002 0205 0003 C0DA 1304 A0C3 04C2 3C84 C682
05CA 0605 16F7 022A 0006 0205 0003 C0DA 1304 A0C3 04C2 3C84 C682
05CA 0605 16F7 022A 0004 C0DA 1304 04C2 A0C3 3C84 CE82 05CA C0DA
1304 A0C3 04C2 3C84 C682 020A 1E10 C0E0 1D98 C103 C143 0583 0913
0603 0914 C185 0645 0606 C2E0 1DB8 C30B C1E0 1D9A C047 C007 E060
028A E020 0286 0607 A307 C80C E002 C801 E000 C0A0 E000 A082 C222
02DA C80B E002 C800 E000 C0A0 E000 A082 C262 02DA 8146 110A 1504
AA88 0016 AA89 000A AA88 0014 AA89 000C 1023 0286 0001 150C AA88
0000 AA89 0008 0286 0001 1119 AA88 0016 AA89 000A 1014 AA88 0016
AA88 001E AA89 000A AA89 001A 8106 1104 AA88 0014 AA89 000C 80C6
1504 AA88 0000 AA89 0008 022B 00A8 022C 00A8 0606 15B9 13B8 0380
F860 17DA C22A 0004 A22A 000A A22A 0010 A22A 0016 0203 0001 0204
0008 8108 1A06 0583 0283 0006 1302 A104 10F8 0603 1508 0205 FFFF
0206 FEF3 0207 3FFF 0460 19BA 0603 1507 0205 EFFE 0206 FCE3 0207
3FFF 1021 0603 1507 0205 CECC 0206 8CCB 0207 3BFF 1018 0603 1507
0205 CC88 0206 048F 0207 3C00 100F 0603 1507 0205 C002 0206 020C
0207 8000 1006 0205 D333 0206 A33C 0207 C040 C220 1D98 C260 1D9A
0228 FFFA 0229 FFF7 D269 0309 06C9 0249 00FF C089 0602 0A22 C048
0601 0A21 A049 A088 D0E2 02F9 06C3 0243 00FF D121 02F9 06C4 0244
00FF C06A 001A C241 A249 A241 C22A 000A 8248 1A01 C201 80C8 1B0C
0265 0840 0266 0C03 0267 2000 0288 0004 1409 0266 0030 1006 0265
101C 0266 035C 0267 CF3F C06A 001C C241 A249 A241 C22A 0010 8248
1A01 C201 8108 1B07 0265 0A00 0266 0003 0267 3030 1006 0265 000F
0266 FDDC 0267 CC00 C06A 001E C241 A249 A241 C22A 0016 8248 1A01
```

Fig. 7j

```
C201 80C8 1B05 0265 080C 0267 0C42 1006 0265 1013 0266 CB5F 0267
B33C C06A 0018 C241 A249 A241 C22A 0004 8248 1A01 C201 8108 1B07
0265 0800 0266 00C0 0267 0C00 1006 0265 020E 0266 3F1F 0267 C0F0
C22A 0006 A22A 0012 0288 0010 1A03 0267 00C0 1006 0265 0F00 0266
C0C0 0267 303C C22A 0004 A22A 0010 0288 0008 1A05 0265 0008 0266
2808 1006 0265 1FF0 0266 40E3 0267 7F3F C22A 0000 A22A 0014 C26A
0008 A26A 000C 8248 1A07 0265 00C1 0266 CC03 0267 3000 1006 0265
000C 0266 0020 0267 CC02 C22A 0006 A22A 0012 C26A 0002 A26A 000E
8248 1A12 6209 0288 002C 1B07 0265 2800 0266 0003 0267 0FCB 1018
0265 32AA 0266 2B6B 0267 CFE3 1011 6248 0289 002C 1B07 0265 0C00
0266 C003 0267 1E0C 1006 0265 0EAA 0266 EB68 0267 F02C C22A 0010
C26A 0004 8248 1A12 6209 0288 002C 1B07 0265 0002 0266 C0C2 0267
0C00 1018 0265 3BFF 0266 FFFC 0267 CD4A 1011 6248 0289 002C 1B07
0265 0200 0266 00C3 0267 38B0 1006 0265 3BFF 0266 3F3F 0267 F3FA
C22A 000A C26A 0016 8248 1A12 6209 0288 002C 1B07 0265 000C 0266
0800 0267 0C03 1018 0265 3B3E 0266 33BC 0267 CFFF 1011 6248 0289
002C 1B07 0265 008E 0266 CC03 0267 3000 1006 0265 3BF3 0266 FFAF
0267 F3FC C22A 0010 A22A 0016 0288 000C 1503 0265 0030 1002 0265
0003 04C1 04C3 04C4 C087 0242 0003 C842 1E10 04E1 1DC0 0642 1504
1102 0584 1001 0583 05C1 0B27 0281 000E 12EE C086 0242 0003 C842
1E10 04E1 1DC0 0642 1504 1102 0584 1001 0583 05C1 0B26 0281 001E
12EE C085 0242 0003 C842 1E10 04E1 1DC0 0642 1504 1102 0584 1001
0583 05C1 0B25 0281 002E 12EE 0205 0001 0206 0002 8143 1111 1521
04C1 8161 1E10 1202 05C1 10FB 0420 1C5E C0A1 1DC0 0282 0060 125A
C846 1E10 0584 8144 115A 152F 04C1 81A1 1E10 1302 05C1 10FB 0420
1C5E C0A1 1DC0 0282 0060 1147 104B 0208 0100 020A 0100 04C9 04C1
8161 1E10 150F 0420 1C5E C0A1 1DC0 8202 1405 C288 C202 C2C9 C241
1004 8282 1402 C282 C2C1 05C1 0281 002E 12EA 0288 0060 1222 C104
1320 0208 0100 020A 0100 04C9 04C1 81A1 1E10 1510 1102 0420 1C5E
C0A1 1DC0 8202 1405 C288 C202 C2C9 C241 1004 8282 1402 C282 C2C1
05C1 0281 002E 12E9 0288 0060 1505 6288 022A FFE0 1106 C049 0911
D821 0317 1DBE 0380 D820 032F 1DBE 0380 F880 1C62 C30D 05CC C2DC
C220 1DB0 C82B 0352 1D9C C82B 0382 1D9E C0A0 1D9C 38A0 1D9E C160
1DAC C1AB 03B2 3985 3A03 38C5 C804 1DB6 6107 6109 0744 6804 1DB6
6247 0749 C809 1DB4 C82B 09B0 1DAA C820 1DB8 1DA8 C1A0 1D9A A806
1DA8 0620 1DA8 04C3 0208 0001 04C4 C160 1D9E C1C5 0420 1D30 8185
1515 C045 6044 3840 A0C2 8185 1107 81C8 131A C105 A147 0620 1DA8
100D C105 A160 1D9E 0620 1DA8 0420 1D30 10E9 C046 6044 3840 A0C2
C106 A1A0 1D9A 0588 05A0 1DAA 0420 1D30 10DC 0202 0100 60E0 1DB4
3883 C020 1DB6 6020 1DB4 3C80 CAC2 1DC0 0380 F840 1D34 04C3 04C4
C160 1D9C C1C5 C1A0 1D98 0208 0001 C2A0 1DAA C260 1DA8 8185 1512
9699 1302 A0C5 60C4 8185 1107 81C8 1315 C105 A147 0229 00A8 100A
C105 A147 0229 00A8 10EC 9699 1302 A0C6 60C4 C106 A1A0 1D98 0588
A2A0 1D9E 10E1 C743 0380 1E74 0154 0154 00A8 0090 0074 005E 0030
0005 F960 1E88 020C 0200 C05D 0241 0007 0A11 C061 1E9A 0451 1EAE
1EAE 1EAE 1EB4 1EAE 1EAE 1EAE 1EF2 C740 0380 04C0 0460 1EAA 1E1C
0200 0960 0600 16FE 1D1C 0200 0000 0201 0100 0202 1000 0203 8000
0204 0600 C172 0206 0010 0A15 1702 DCC1 1001 DCC0 0606 16F9 0604
16F4 04C0 0460 1EAA 020B 0801 C2A0 1E76 081A 0209 8000 C020 1E78
3820 1E80 6241 C220 1E7E 6220 1E80 C1E0 1E7A A1E0 1E80 0227 8200
C1A0 1E76 61A0 1E7A 61A0 1E7E C020 1E82 C000 1312 C060 1E74 C041
130C C80B E000 0202 0002 0602 16FE C80A E000 C80A E000 0601 10F2
0600 10EC 0200 1F0E 1E1C 0600 16FE 1D1C C020 1E7C C000 130C C80B
E000 0201 0002 0601 16FE C80A E000 C80A E000 0600 10F2 C009 C060
1E78 C041 1311 C80B E000 0202 0002 0602 16FE C800 E002 C808 E000
C807 E000 C806 E000 0580 0601 10ED 04C0 0460 1EAA F980 1FB8 C01D
0280 0004 160C 0200 FE00 0201 FE40 C081 0222 0040 CC70 8081 16FD
0420 22C4 04C0 0380 0420 2094 0380 F9C0 1FE6 0300 0000 C0CD C033
D073 06C1 0241 00FF D093 06C2 0242 00FF 0206 0A00 2F06 0206 0D00
2F06 2F06 C102 C0C1 D170 1604 0206 2000 2F06 1003 0206 2A00 2F06
0603 16F5 0220 00A9 6001 0206 0A00 2F06 0206 0D00 2F06 0604 16E9
0206 0700 2F06 0380 F9C0 2048 0200 1FDC 0201 FFAA CC70 CC70 C450
```

Fig. 7k

```
COOF 0240 000F 0280 0003 1404 024F FFF0 022F 0003 04C5 020C 0100
0200 005F 33C0 1E00 1D03 0380 F9C0 2080 0300 0000 020C 0100 0200
0001 33C0 1E00 1E03 0380 F9C0 2098 0585 020C 0100 1D03 0380 F9C0
20A6 0300 0000 2FA0 220A 04C6 04C7 04C8 04C9 04CA C145 131B 0605
0586 0286 000A 1615 04C6 0587 0287 000A 1610 04C7 0588 0288 000A
160B 04C8 0589 0289 000A 1606 04C9 058A 028A 000A 1601 04CA 10E3
2E0A 2E09 2E08 2E07 2E06 2FA0 2220 0380 F9C0 2106 0300 0000 02E0
F9C0 020C 0200 1D1A C10D 05C4 C074 C094 C281 024A 00FF 022A 0200
0241 FF00 06C1 1D18 1D19 C082 1317 0204 0100 0604 16FE C01D C241
1E19 C249 130B C800 E002 1E18 C80A E000 04E0 E000 1D18 0580 0609
10F3 1D19 0602 10E7 1E1A 0380 02E0 F9E0 0413 0460 0080 02E0 F9E0
2FA0 226A 020C 0080 1F15 1309 0200 8000 0201 A890 0202 0020 0420
2102 10F5 1E12 0460 0080 02E0 F9E0 0300 0000 020C 0080 1F15 1311
020C 0200 1F01 130C 0200 0007 0420 1E84 0200 8000 0201 A890 0202
0020 0420 2102 10EB 1E12 0460 0080 02E0 F9C0 0200 0600 0201 8000
0202 5400 C000 130F 04C3 0204 0010 C104 1307 0A13 D451 1301 0583
0581 0604 10F7 CC83 0600 10EF 2FA0 222A 0460 0080 0D0A 2045 5845
4355 5449 4F4E 2054 494D 4520 3D20 0000 204D 5345 4320 0D0A 0000
2050 4143 4B20 4953 2043 4F4D 504C 4554 4520 0D0A 2053 5441 5254
2041 4444 5220 3D20 3E35 3430 3020 0D0A 2053 544F 5020 4144 4452
2020 3D20 3E35 4646 4520 0000 2054 4F20 4558 4954 2045 4E54 4552
2027 4527 0D0A 0700 0000 0000 0000 0420 22C4 0380 F9A0 2292
020C 0240 1D00 1E0F 1D0F 1E00 1D13 1D12 1D11 1D10 1D18 1D19 1D1B
1E1A 0200 2288 0201 FF0E CC70 CC70 CC70 1D01 2FA0 22F2 0380 F9A0
22C8 0201 FE40 0202 0D0A C842 000E C842 001E C842 002E C842 003C
04E1 003E 2FA0 231A 2FA0 FE40 2FA0 2316 0380 0D0A 5449 4249 5320
5349 4D55 4C41 544F 5220 4953 2049 4E49 5449 414C 495A 4544 0D0A
0700 0D0A 0000 0D0A 0D0A 0000 0D0A 494C 4C45 4741 4C20 4F43 5220
434F 4445 0700 FC8A
```

12/19/79    11:35:21    SDSLNK           3.2.2

CHARACTER RECOGNITION METHOD AND APPARATUS

BACKGROUND OF THE INVENTION

1. Field of the Invention

This invention relates to character recognition and more particularly to the recognition of character images formed in a memory in which the unknown character is first categorized into a category wherein it and one or more possible characters fit, with a final comparison made between each of the possible characters and the known character of the category.

2. Description of the Prior Art

Prior art systems, by and large, have involved "brute force" type of hardware solutions for the recognition of characters. For example one character at a time may be read and deciphered through a programmed logic array (PLA). The PLA scheme is presently used by manufacturers of optical character recognition devices.

The PLA approach is very fast, as required for reading and recognizing magnetic ink characters on checks, but is quite expensive.

Reading bar codes for grocery store check out operations is quite fast, but is also quite expensive.

In this preferred embodiment, an entire National Retail Merchants Association price tag, consisting of approximately 40 characters, must be read within one second. The expensive "brute force" systems mentioned above would be far too expensive and the microprocessor-microcontroller system of this invention provides adequate speed at low cost.

BRIEF SUMMARY OF THE INVENTION

A microprocessor serving as a central processor unit controls a microcontroller for examining the contents of a random access memory which is an image of, in this preferred embodiment, the image received on the face of a CCD imager. The RAM is arranged in columns and rows of bits which are arbitrarily designated as pixels with white pixels being of a "0" binary value and black pixels being of a "1" binary value.

A read-only memory (ROM) contains instructions for controlling the microprocessor. The microprocessor also has a RAM working memory for storage during its computing operations.

The microcontroller is designed to perform certain functions, such as counting pixels, searching for patterns of pixels and loading the image RAM. Since the microcontroller is designed to perform these functions solely, it is much faster at doing so than any known microprocessor. Therefore, the microprocessor initiates operations of the microcontroller through a microcontroller instruction latch. Once instructed, the microcontroller performs its assigned tasks, signalling the microprocessor when the task is finished. For example, the first unknown character on a tag is desired to be located. The microprocessor then instructs the microcontroller to begin searching the image memory by counting pixels in a vertical direction, perhaps half way up the image before going to the next column and counting pixels. When a transition from white to black is encountered, to make sure that an unknown character has been discovered, the pattern search mechanism requires that the black pixels next be counted for a typical count of eight pixels. If four or more of those pixels are black, then it is determined that a character is present.

The next character to the right is then located, and the next and the next, and so on. This determines a base line for one row of characters. If the price tag was skewed, all the characters (and furthermore all of the base lines of each row of characters) are skewed. The industry format for these tags requires that the skew from character to character be plus or minus two degrees so that, for all practical purposes once having determined the skew of one base line, all the base lines can be considered to be skewed by the same angle.

Once having determined the skew angle, the data array on the tag is rotated by the angle to deskew it. A simple row and column shifting operation is satisfactory. If the skew angle is $\tan^{-1} N/M$, then the Kth row is shifted over by a number of pixels equal to the integer quotient of KN divided by M, and likewise for the columns. The net result of this operation is a slight magnification of the character along one axis and a demagnification along the other. However, since this effect is less than one unit cell in magnitude normally, the binary quantization of the data suppresses this effect entirely.

A "window" is formed around the first unknown character and a penetration is made from top and bottom and each side of the window to determine the number of white pixels until the black pixels of the unknown character are encountered. The pixels within the window are all weighted and then the white pixels from each side from top and bottom are summed. In addition, the upper and lower half of each side and the left and right half of both top and bottom are separately considered and summed to further categorize the unknown character. Finally, the white pixels defined within the black pixels of the character are counted with all of these summations then being combined. Such combination yields possible characters from the character set. At this point, an actual bit by bit comparison with the pattern character is made for a determination of the unknown character's identity.

A not insignificant part of this character recognition scheme is the removal of dirt. For example, if a single black pixel is found surrounded by white pixels, it is eliminated. Also, after deskewing, bumps on characters are sought out and eliminated. The final result is a character that is imperfect but recognizable.

The major object of this invention is to provide apparatus for rapidly determining the identity of a plurality of characters in an efficient and economical manner.

This major object and other objects will be made evident in the detailed description that follows.

BRIEF DESCRIPTION OF THE DRAWINGS

FIGS. 2a and 2b represent a schematic diagram of the microprocessor and decoder circuitry of this invention.

FIGS. 7a–7k illustrate the map of the bits of the ROM that controls the microprocessor.

DETAILED DESCRIPTION OF THE INVENTION

Figure 1A:
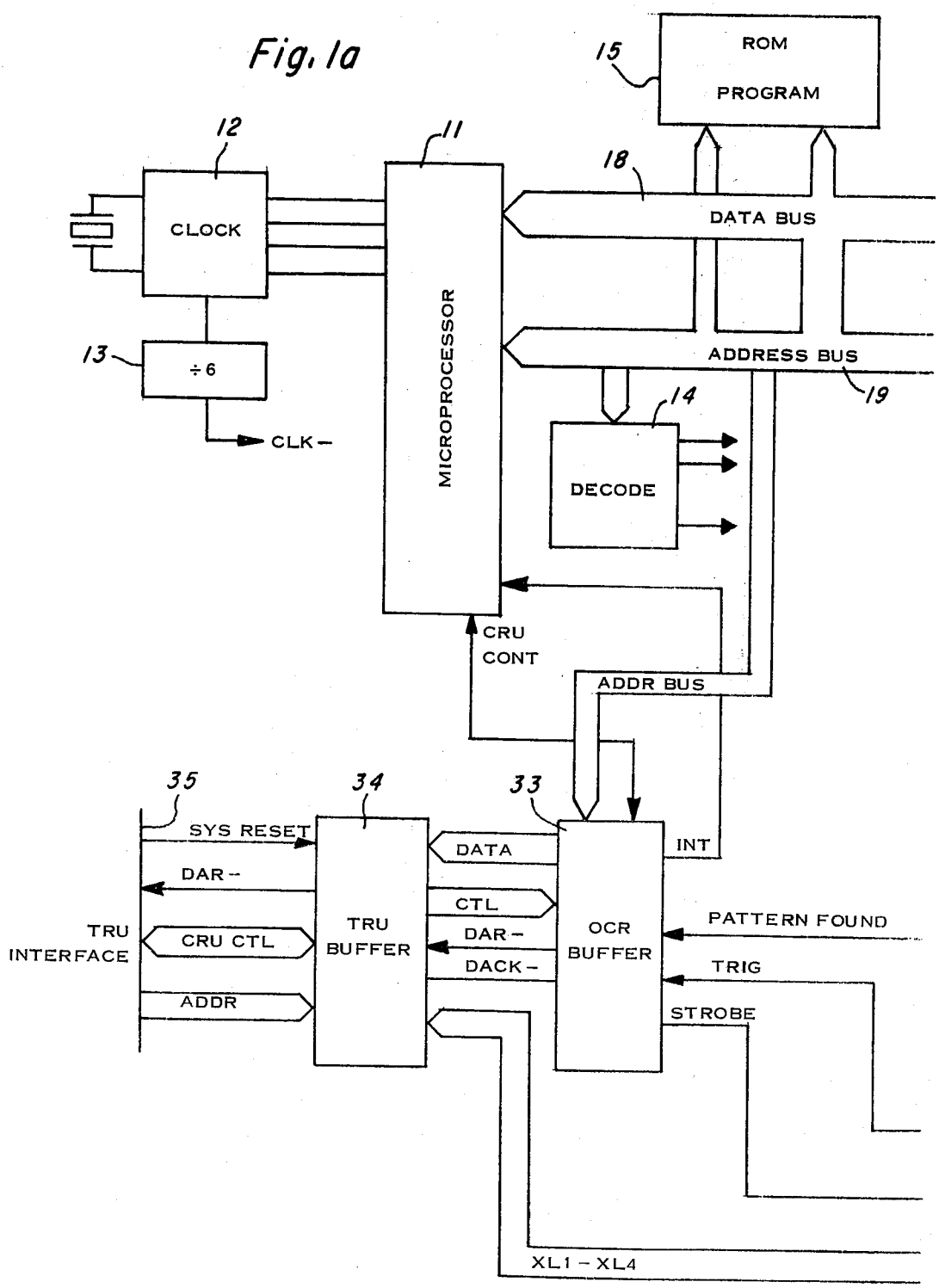
FIGS. 1a and 1b represent a block diagram of the character recognition apparatus of this invention.
Figure 1B:
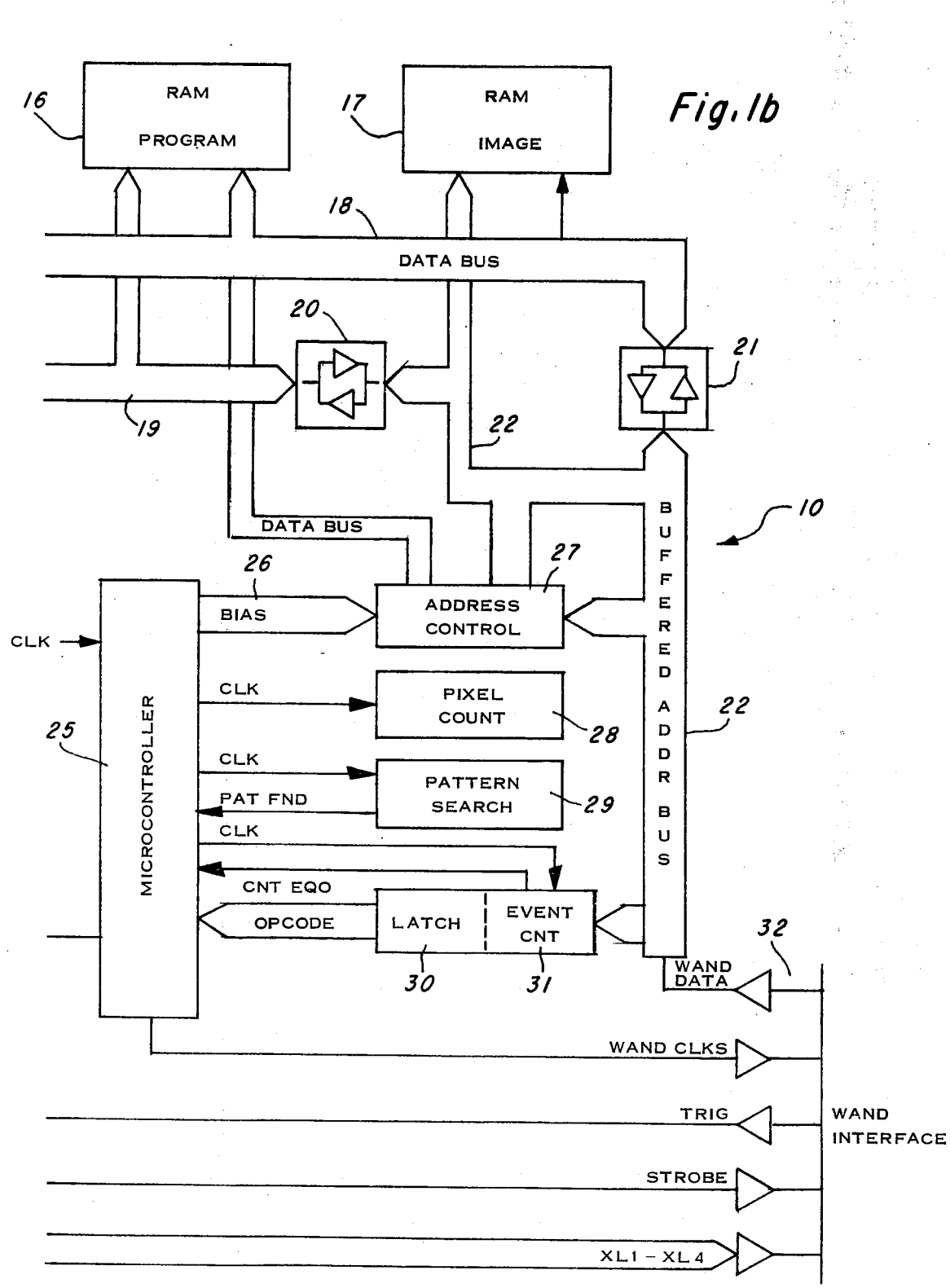

FIG. 1 illustrates microprocessor 11 being clocked by clock 12 which also has a divider 13 connected thereto to provide a frequency divided by 6 which is the output "CLK—." Microprocessor 11, in this preferred embodiment, is a Texas Instruments Type 9900 microprocessor which is described in detail in the Texas Instruments Incorporated Manual entitled "Bipolar Microcomputer Components Data Book for Design Engineers" dated January, 1977, beginning at Section 3, Page III. Clock 12 is a Texas Instruments Type SN74LS362 Four-Phase Clock Generator/Driver described beginning at Page 7-460 of Texas Instruments Incorporated Handbook entitled the "TTL Data Book for Design Engineers" Second Edition, Copyright 1976. Divider 13 is a Texas Instruments Type SN74S169 described beginning at Page 7-226 of the TTL Data Book. ROM 15 is connected to microprocessor 11 through data bus 18 and address bus 19. The working RAM 16 is also connected to microprocessor 11 through data bus 18 and address bus 19. Image RAM 17 is connected through buffered address bus 22 and transceivers 20 to the address bus 19 and finally to the microprocessor 11. Image RAM 17 is also connected to microprocessor 11 through data bus 18. Decode 14 decodes microprocessor 11 instructions and is connected to microprocessor through address bus 19.

Latch 30 connects to microcontroller 25 and contains instructions for microcontroller 25 which are sent from the microprocessor 11 through data bus 18, transceiver 21 and buffered address bus 22. Event counter 31 is connected to microprocessor 11 using the same path as indicated above with a word from microprocessor 11 providing the instruction for latch 30 and the count for the event counter 31. Address control 27 is connected to buffered address bus 22 and through bias 26 to microcontroller 25. The address control provides a means of addressing image RAM 17 for loading and retrieving data. In this particular embodiment, the image of the NRMA price tag is formed on a CCD imager which is part of a staring wand assembly. The CCD imager of this preferred embodiment is described and claimed in U.S. patent application, Ser. No. 042,749, entitled "Block Output CCD Imager," filed May 29, 1979 now U.S. Pat. No. 4,251,834 issued Feb. 17, 1981, and assigned to the assignee of this invention. Wand interface 32 communicates wand data available to the buffered address bus 22, trigger signal input, with strobe and buffer signal outputs.

OCR buffer 33 receives the trigger and strobe signals from the wand interface 32, is connected to microprocessor 11 through address bus 19 and receives a "pattern found" signal from microcontroller 25. OCR buffer 33 is connected to TRU buffer 34 which is the buffer that communicates with, in this preferred embodiment, a transaction register unit for outputting to that unit the recognized characters. TRU buffer 34 is also connected to the wand interface 32.

Figure 2B:
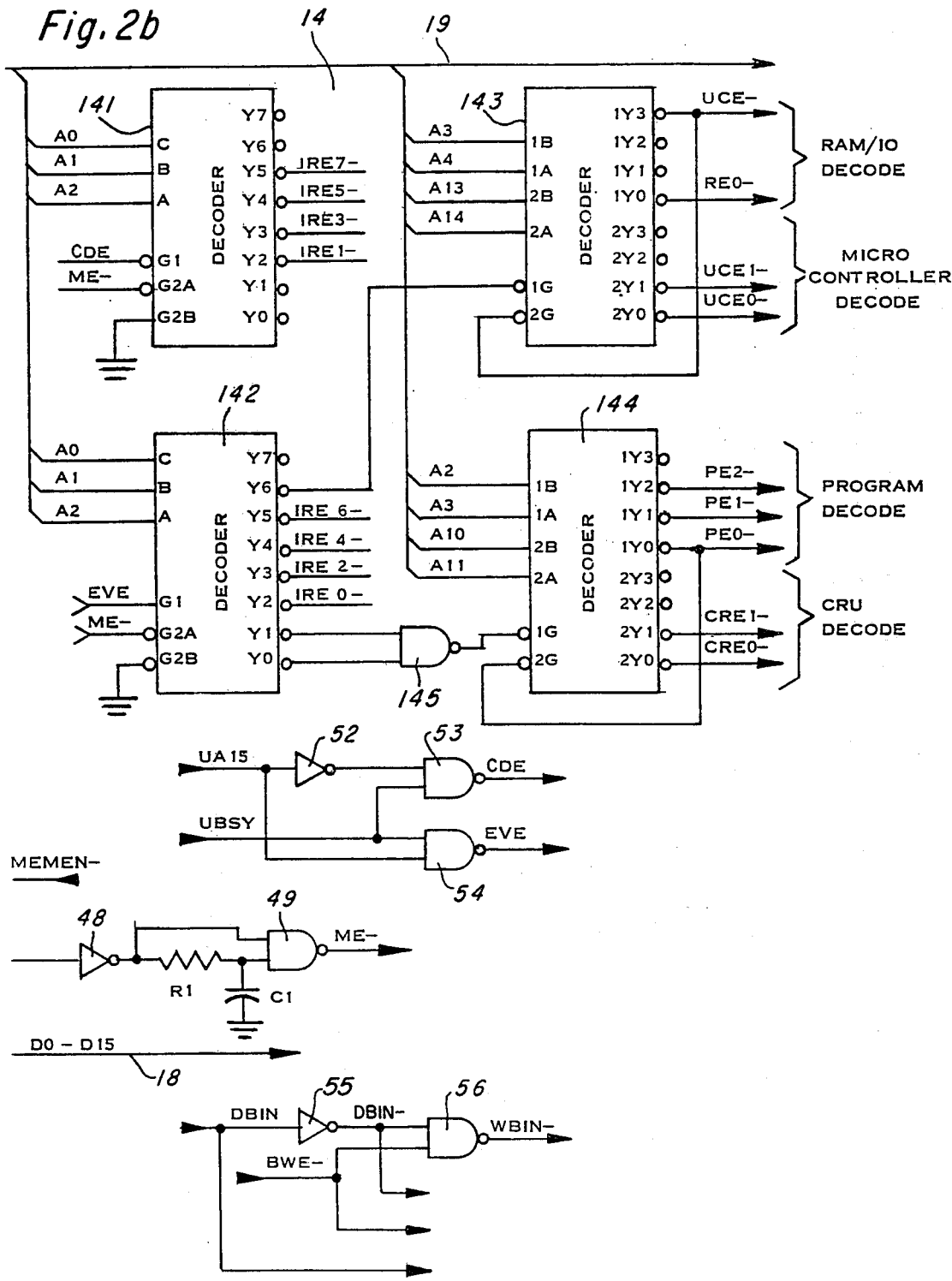

Turning now to FIGS. 2a and 2b, the microprocessor 11 and associated circuitry is shown in more detail. In the description that follows, the inverse of a function is indicated by a dash following the function. For example, the inverse of signal ITRIG is indicated as ITRIG—. Signal ITRIG— is applied to terminal IC3 of microprocessor 11 and comes from terminal D0, selector 330 of TRU buffer 34 shown in FIG. 3. Signal IRTY— from the output of inverter 335 whose input comes from latches 342 (FIG. 3b) of buffer 33 is applied to terminal IC2 of microprocessor 11. Signals ITRIG— and IRTY— provides inputs to OR circuit 45 whose output is inverted through inverter 46 and applied to terminal INTREQ— of microprocessor 11. Clock 12 provides four clock phases into microprocessor 11 through resistors 44. A tank circuit comprised of capacitor 42 and inductor 41 is impressed across terminals T1 and T2 of clock 12 with frequency setting crystal 43 connected across terminals X1 and X2 of clock 12. A 12 MHz signal from clock 12 is transmitted to counter 13 which divides by 6 and provides a 2 MHz output which is inverted through inverter 50 providing the output signal CLK—.

Addresses A0-A14 from microprocessor 11 are carried as signals on conductors that form address bus 19 and data lines D0-D15 from microprocessor 11 form data bus 18.

Signal MEMEN— from the microcontroller latch, specifically from three-state output buffer 308 of FIG. 6 provides an input to terminal MEM— of microprocessor 11 to signal that the microcontroller wants the data and address busses. Signal MEMEN— is also inverted through inverter 48 and applied through resistor R1 to one input of NAND gate 49 and directly from the output of inverter 48 to the other input of NAND gate 49. Filter capacitor C1 is connected from the junction of resistor R1 to ground. The output of NAND gate 49 is signal ME— which is applied as an enable input to terminal G2A of each of decoders 141 and 142. Decoders 141 and 142 in this preferred embodiment, are Texas Instruments Type SN74LS138 3-to-8 line decoders, and decoders 143 and 144 are Texas Instruments Type SN74LS139, both described beginning at Page 7-134 of the TTL Data Book. Select signal UA15 is applied to the input of inverter 52 and also to one input of NAND gate 54. Select signal UBSY is applied to the other input of NAND gate 54 and also to one input of NAND gate 53 whose other input is provided by the output of inverter 52. Output signal CDE from NAND gate 53 provides an enable input to decoder 141, while output EVE from NAND gate 54 provides an enable signal input to decoder 142.

Signal DBIN from microprocessor 11 provides an input to inverter 55 whose output provides one input to AND gate 56. The other input to AND gate 56 is provided by signal BWE— from buffer 47 which is the output from terminal WE— of microprecessor 11. The output of AND gate 56 provides signal WBIN—.

Address lines A0, A1 and A2 provide the C, B and A select inputs, respectively, of each of decoders 141 and 142. Address lines A3, A4, A13 and A14 are connected to select inputs 1B, 1A, 2B and 2A, respectively, of decoders 143. Address lines A2, A3, A10 and A11 are connected to select inputs 1B, 1A, 2B and 2A, respectively, of decoders 144. Outputs Y2-Y5 of decoder 141 provides output signals IREI−, IRE3−, IRE5−, and IRE7−, respectively. Outputs Y2-Y5 of decoder 142 provide signals IRE0−, IRE2−, IRE4− and IRE6−, respectively. Output terminal Y6 of decoder 142 is connected as an enable input to terminal 1G of decoders 143. Terminal 1Y3 of decoders 143 provides signal UCE− which is applied as an enable signal to enable input 2G of decoders 143. Output terminal 1Y0 of decoders 143 provides signal REO−.

Outputs Y0 and Y1 from decoders 142 provide inputs to AND gate 145 whose output is connected to the enable terminal 1G of decoders 144. Outputs 1Y0-1Y2 of decoders 144 provides program decode signals PE0− through PE2−, respectively. Output terminals 2Y0 and 2Y1 of decoders 144 provides the CRU decode signals CRE0− and CRE1−, respectively. The CRU decode is simply a decoding for the transaction register unit output.

Figure 3A:
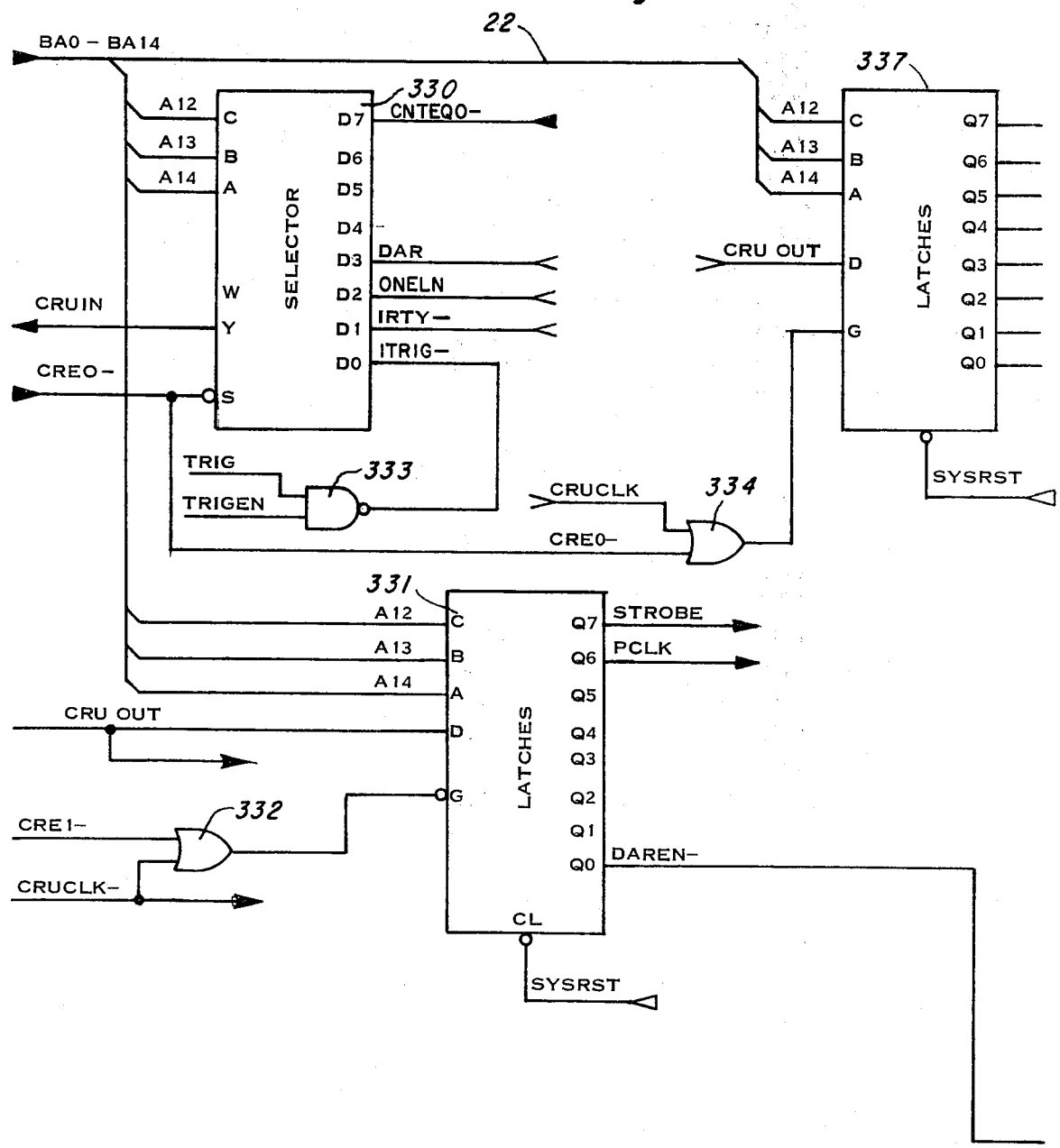
FIGS. 3a and 3b schematically illustrates the circuitry for interfacing with the device serviced.
Figure 3B:
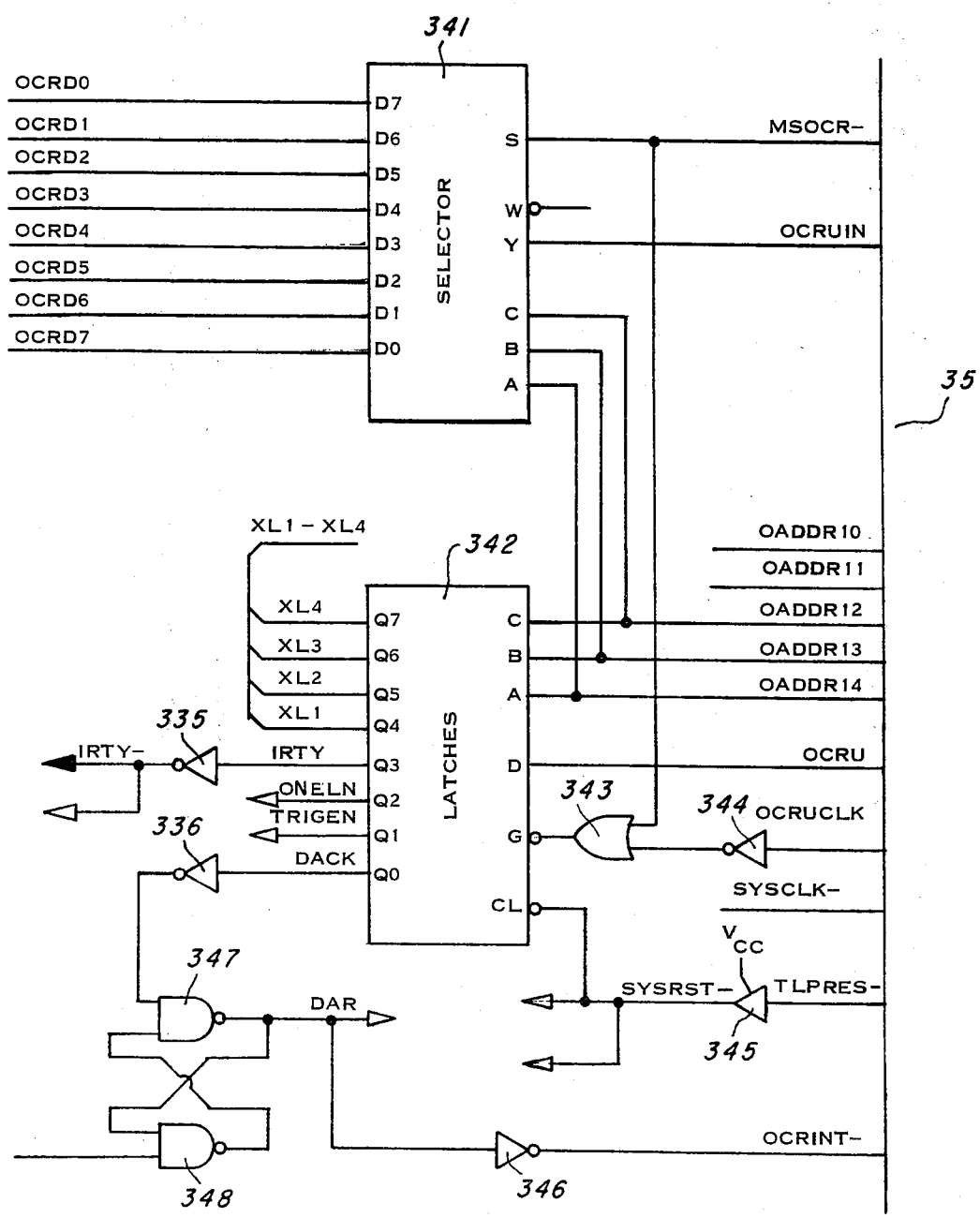

FIGS. 3a and 3b illustrate TRU buffer 34 and OCR buffer 33. Selectors 330 and 341 are Texas Instruments Type SN74LS251 data selectors described beginning on page 7-362 of the TTL Data Book. Latch assemblies 331, 337 and 342 are all Texas Instruments Type SN74LS259, described beginning at Page 7-376 of the TTL Data Book. Latches 342, selector 341 and associated circuitry form OCR buffer 33, while selector 330, latches 331 and 337, and assocciated circuitry form TRU buffer 34. Buffered address lines A12, A13, and A14 are connected to the select inputs C, B and A respectively of selector 330. They are also connected to select inputs C, B and A of latches 337. Signal CRE0− provides a strobe input to selector 330 and signal CRE1− from decoder 144 provides one input to OR circuit 332 whose other input is signal CRUCLK from microprocessor 11. The output from OR circuit 332 provides the enable input to latches 331. The TRIG signal from the wand interface is applied as one input to NAND gate 333 whose other input comes from the Q1 output of latches 342. The output of NAND gate 333 provides the D0 input to selector 330 and also provides an input, as indicated earlier, for the microprocessor 11. Other inputs to selector 330 are signals DAR from NAND gates 347 and 348, applied to input terminal D3; signal ONELN from the Q2 output of latches 342 and input terminal D2; IRTY-signal from the output of inverter 335 applied to terminal D1 and finally, signal CNTEQ0−, the carry output signal from the event counter up down counter 331 of FIG. 5. Signal CREO− provides one input to OR circuit 334 whose other input is provided by signal CRUCLK from microprocessor 11 and whose output provides the enable input to terminal G of latches 337.

Latches 331 provide output signals STROBE and PCLK from terminals Q7 and Q6, respectively, which go to the wand interface 32. Output signal DAREN− from terminal Q0 of latches 331 provides one input to AND gate 348 whose other input is provided by the output of NAND gate 347. The output of NAND gate 348 provides one input to NAND gate 347 whose other input is provided by the output of inverter 336. NAND gates 347 and 348 form a latch circuit whose output signal, DAR, is inverted through inverter 346 and provided to the TRU interface 35.

Outputs Q0 through Q7 of latches 337 provide inputs D0 through D7, respectively, of selector 341. Signal MSOCR− from the TRU interface provides a strobe input to selector 341 and provides one input to OR circuit 343 whose other input is provided by the output of inverter 344 which inverts signal OCRUCLK from the TRU interface. Data select inputs C, B and A of selector 341 are provided by signals OADDR12, OADDR13 and OADDR14, respectively, from the TRU interface which also provide the latch select signals to terminals C, B and A, respectively, of latches 342. Output signal OCRUIN is provided by selector 341 to the TRU interface. Latches 342 provide for input of data as represented by signal OCRU to terminal D, the output of OR circuit 343 providing the enable signal to terminal G. A clear signal is provided by signal SYSRST− from buffer 345. Output terminal Q0 provides an input to inverter 336; output pin Q3 provides an input to inverter 335 whose output is signal IRTY−. Terminals Q4 through Q7 provide signals XL1 through XL4, respectively, which are applied to the wand interface. These latter signals are for the operator to determine whether all of the rows have read properly from the wand.

The TRIG signal from the wand indicates that the operator has enabled the trigger on the wand which then calls for loading of the image RAM 17 and the microprocessor 11 instructs the microcontroller 25 accordingly.

Figure 4A:
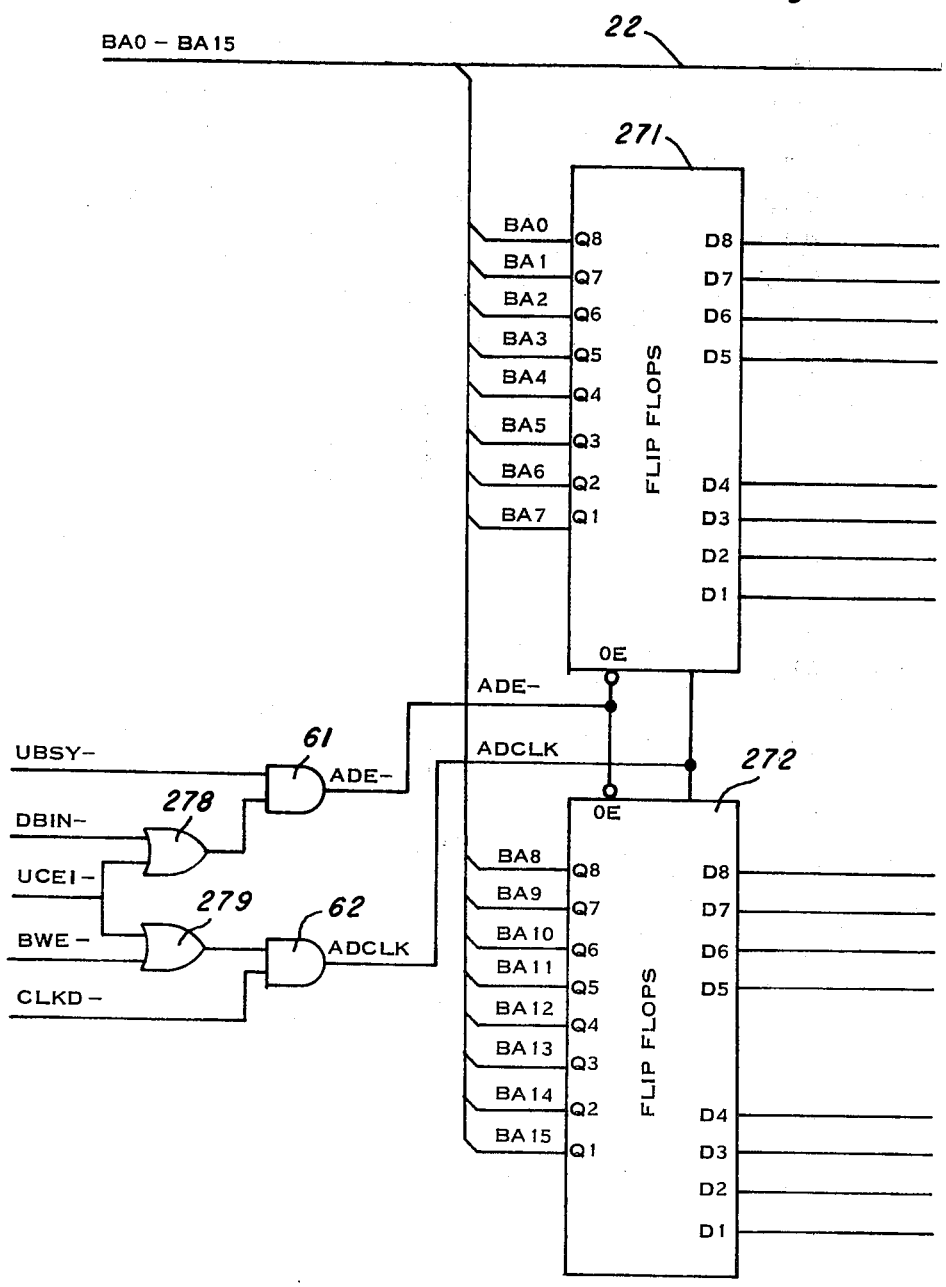
FIGS. 4a and 4b represent a block diagram of the address control shown in FIG. 1.
Figure 4B:
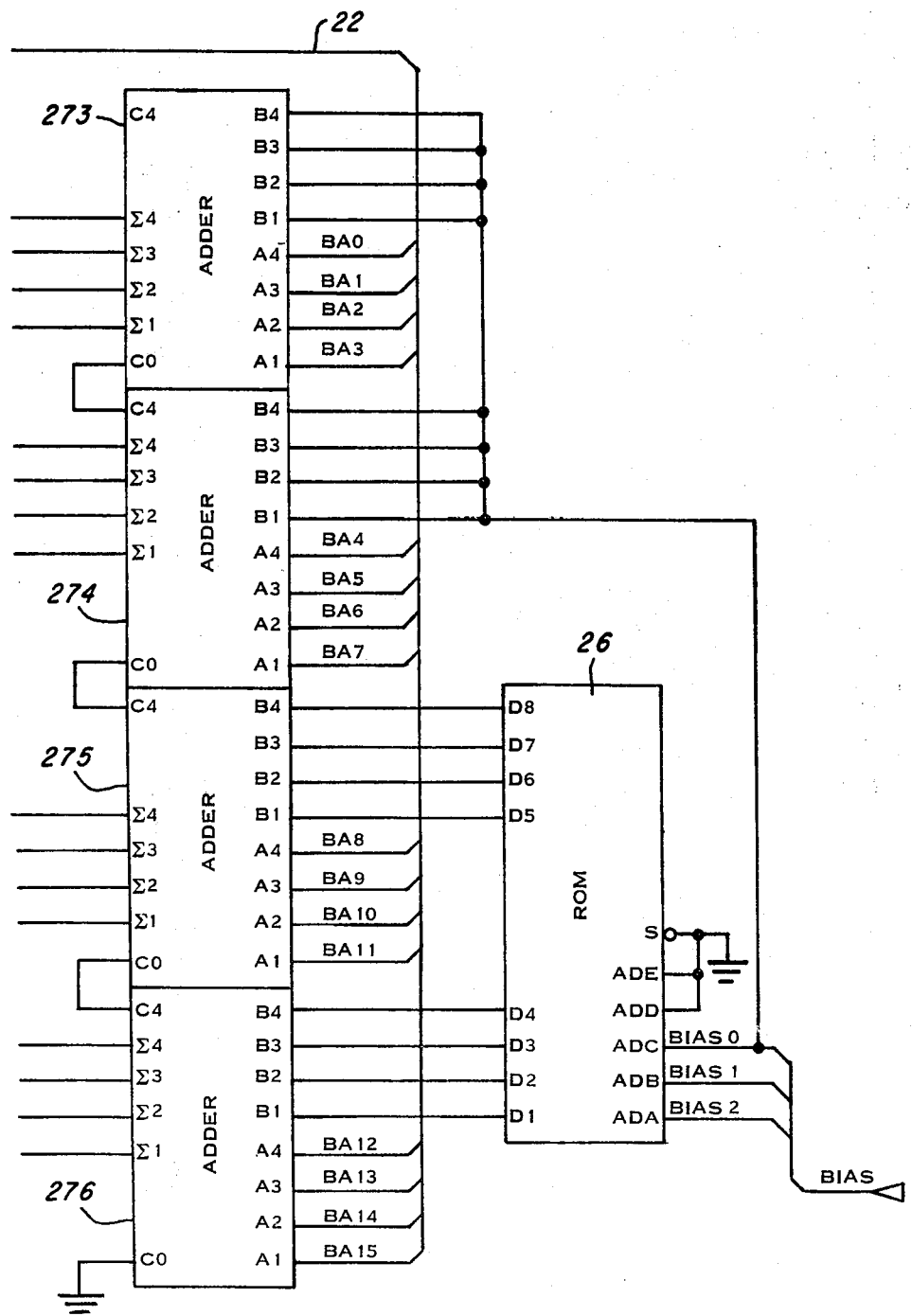

Referring now to FIGS. 4a and 4b, the address control 27 and bias 26 are shown. The bias 26 is simply a ROM whos ADA, ADB and ADC inputs are provided by signals bias 2, bias 1 and bias 0 from output terminals Q8, Q7 and Q6, respectively, of microcontroller latch 301 shown in FIG. 6. The bias 0 signal also provides an input on terminals B1 through B4 of adder 276 are provided by outputs from ROM 26 on teminals D1 through D4, respectively, and inputs B1 through B4 of adder 275 are provided by ROM 26 outputs on terminals D5 through D8, respectively. Adders 273 through 276 are Texas Instruments Type SN74LS283, described beginning at page 7-415 of the TTL Data Book. Signal lines BA0 through BA3 from buffered address bus 22 provide the A4 through A1 inputs to adder 273; lines BA4 through BA7 provide inputs to input terminals A4 through A1 of adder 274; lines BA8 through BA11 provide inputs to terminals A4 through A1 of adder 275; lines BA12 through BA15 provide inputs to terminals A4-A1 of adder 276. Adders 273 through 276 are Texas Instruments Type SN74LS283 4-bit binary full adders described beginning at Page 7-415 of the TTL data book. These adders are concatinated by connecting together the C0 terminal of one to the C4 terminal of the next. Flip flop array 271 has input lines D1 through D8 provided by output Σ1 through Σ4 of each of adders 274 and 273, respectively. Flip flop array 272 has inputs D1 through D8 supplied by outputs Σ1 through Σ4 of each of adders 276 and 275. The outputs BA0 through BA7 and BA8 through BA15 from flip flop arrays 271 and 272, respectively, are output on bus 22.

Signal DBIN from microprocessor 11 and signal UCE1− from decoders 143 provide inputs to OR circuit 278 whose output provides one input to AND gate 61. Signal BWE− from microprocessor 11 provides one input to OR gate 279 whose other input is provided by the signal UCE1−. The output of OR gate 279 provides one input to AND gate 62. Signal UBSY−, from microcontroller 25 provides the other input to AND gate 61 whose output signal ADE− provides the input to terminals OE both of flip flop arrays 271 and 272. Signal CLKD− from the output of NAND gate 261 of microcontroller 25 provides the other input to AND gate 62 whose output signal ADCLK— provides the clock inputs to each of flip flop arrays 271 and 272.

Figure 5A:
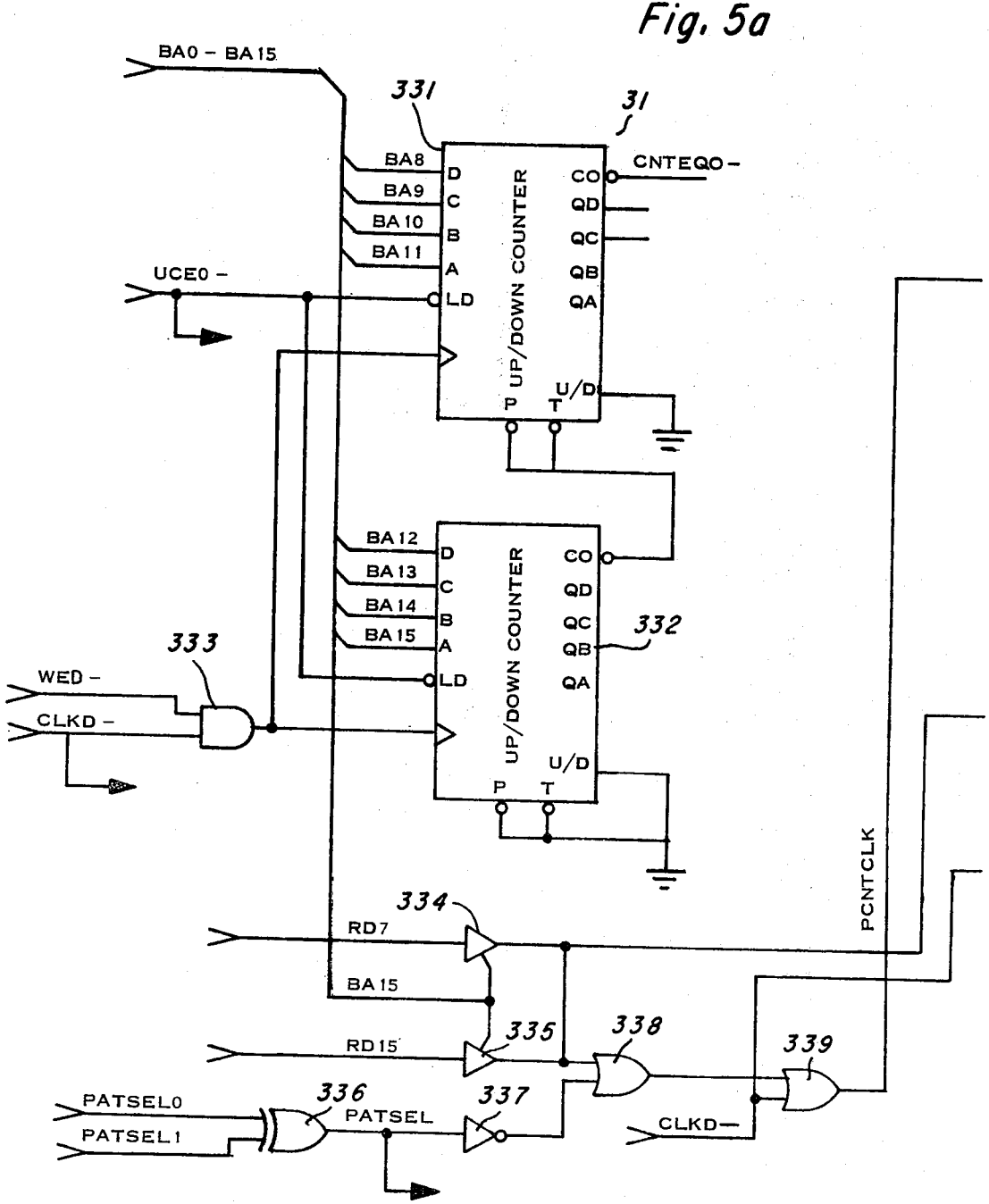
FIGS. 5a and 5b schematically illustrates the event counter, pixel counter and pattern search circuitry of FIG. 1.
Figure 5B:
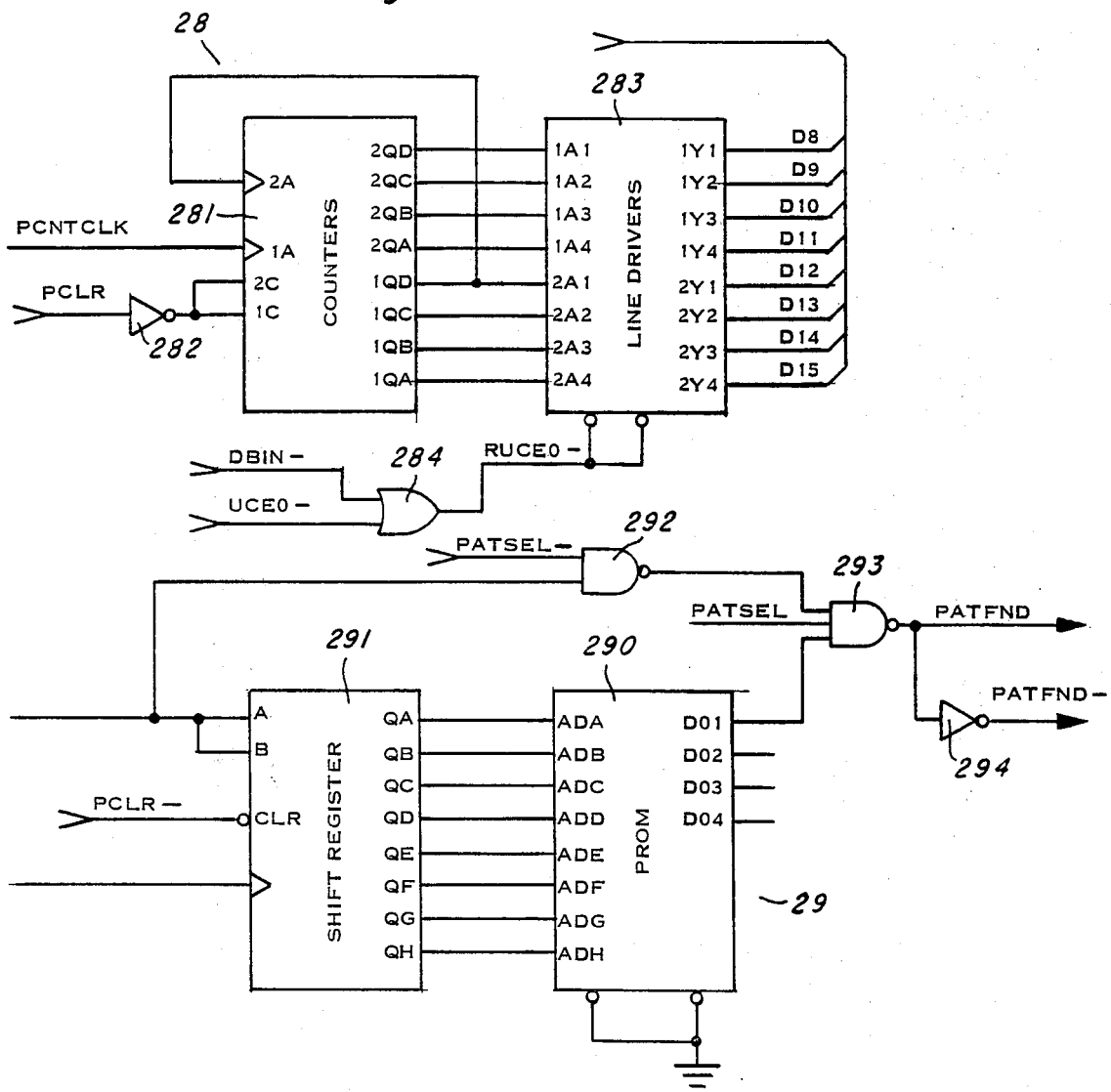

FIGS. 5a and 5b schematically illustrates the event counter 31, the pixel counter 28 and pattern search 29. Event counter 31 is made up of Up-Down Counters 331 and 332 which are Texas Instruments Type SN74LS169, described beginning at Page 7-226 of the TTL Data Book. Lines BA8 through BA11 provide inputs on terminals D through A of counter 331 and lines BA12 through BA15 provide inputs on terminal D through A of counter 332. The carry out terminal of counter 332 provides a carry signal into counter 331 whose carry out output, as indicated earlier, provides an input to the OCR buffer 33, and also provides an input to microcontroller 25, specifically as one input to OR circuit 256 of FIG. 6. Signal UCE0— provides the load signal to counter 331 and counter 332. The clock input for counters 331 and 332 is provided by the output of AND gate 333 whose inputs are signals WED— and CLKD— from microprocessor 25.

Signals PATSEL0 and PATSEL1 from the microprocessor latch 30 provide inputs to exclusive OR gate 336 whose output signal PATSEL is inverted through inverter 337 and also provides one input to NAND gate 292. Buffers 334 or 335, gated by signal BA15— and BA15 respectively, provide one input to OR gate 338 whose other input is provided by the output from inverter 337. The output from buffers 334 and 335 also provide the A and B inputs to serial input shift register 291. Shift register 291 is a Texas Instruments Type SN74LS164 8-bit parallel output serial shift register described beginning at page 7-206 of the TTL Data Book. Shift register 291 stores eight bits representing eight pixels which are examined to determine whether they are black or white. The output of buffers 334 and 335 also provides the other input to NAND gate 292 whose output provides one output to NAND gate 293. The other input to OR gate 339 is provided by signal CLKD— and the output signal PCNTCLK starts one of the counters in counter assembly 281. Counter 281 is a dual 4-bit binary counter from Texas Instruments, Type SN74LS393, described beginning at Page 7-489 of the TTL Data Book. The clear signal for these counters is provided by signal PCLR— from microcontroller 25 which is inverted through inverter 282 and applied to terminals 2C and 1C of counters 281. Outputs 1QD through 1QA from counters 281 provide inputs to terminals 2A1 through 2A4 of line drivers 283. Outputs 2QD through 2QA of counters 281 provide inputs to terminals 1A1 through 1A4, respectively, of line drivers 283. Output terminal 1QD also provides the begin count input on terminal 2A of counters 281. Outputs 1Y1 through 1Y4 from line drivers 283 provides output signals D8 through D11. Outputs 2Y1 through 2Y4 provide output signals D12 through D15. Signals DBIN— and UCE0— provide inputs to OR gate 284 whose output provides the output control for the line drivers 283. Thus, the pixel counter is comprised of counters 281, line drivers 283 and miscellaneous circuitry described.

The pattern search comprises PROM 290 and shift register 291, together with supportive circuitry previously described. The PROM is addressed by terminals ADA through ADH which are connected to output terminals QA through QH of shift register 291. If the appropriate number of black (1) pixels are in shift register 291, then the output D01 of PROM 290 will be a "1." Output D01 is connected to NAND gate 293 which has a third output from exclusive OR gate 336, namely signal PATSEL. The output from NAND gate 293 is signal PATFND which is inverted through inverted 294 providing also signal PATFND—, both of which are inputs to microcontroller 25.

Figure 6A:
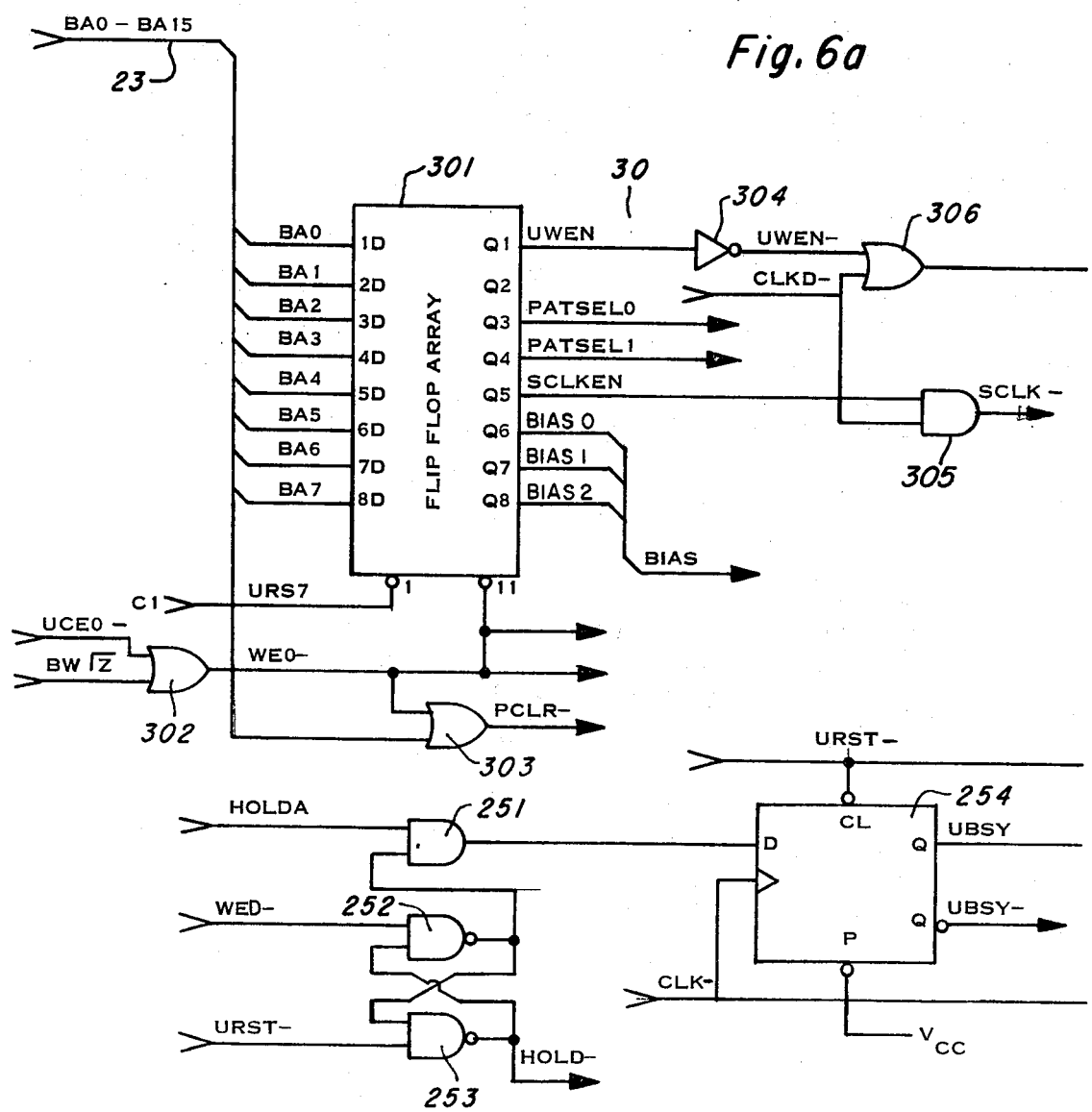
FIGS. 6a and 6b schematically illustrates the instruction latch for the microcontroller and the microcontroller.
Figure 6B:
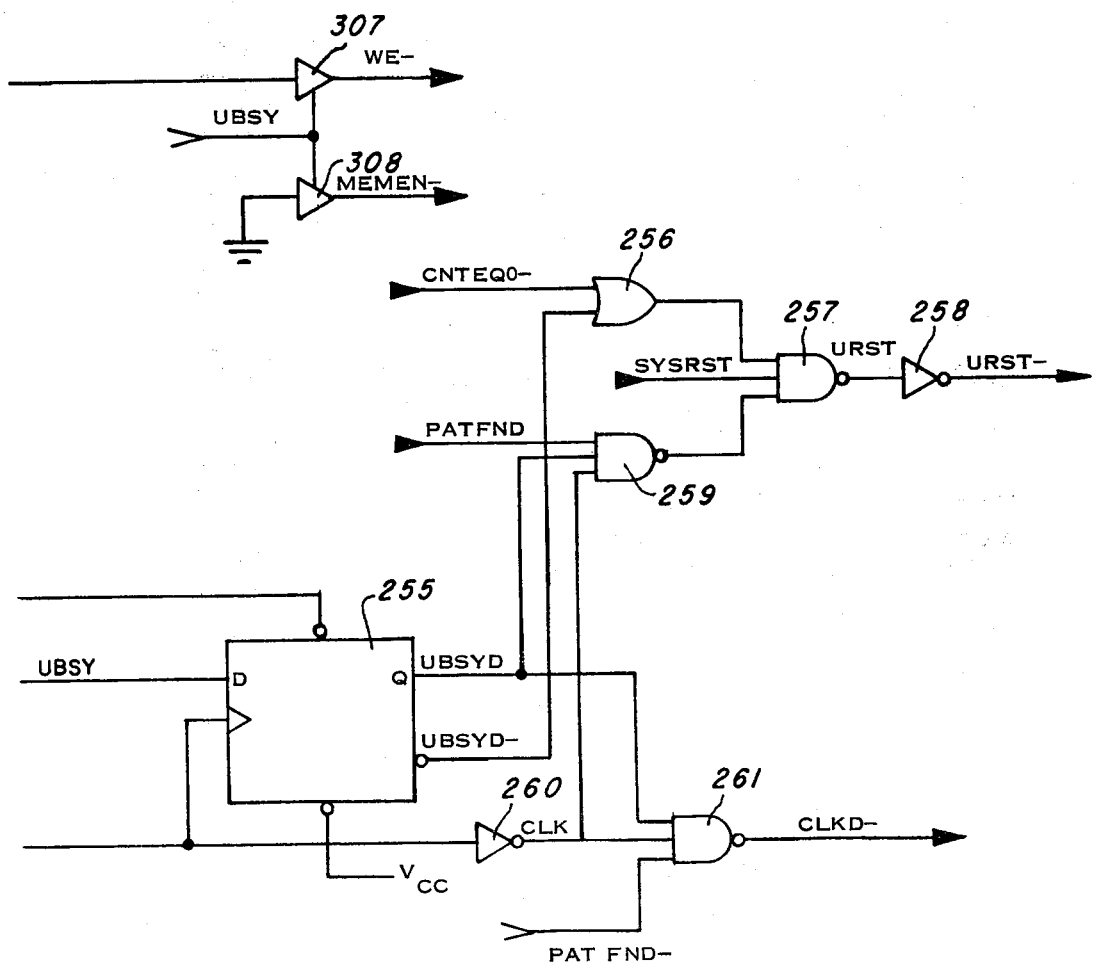

Microcontroller 25, together with instruction latch 30 and associated circuitry is shown in FIGS. 6a and 6b. Flip flop array 301 is the instruction latch 30 for microcontroller 25. Inputs on terminal 1D through 8D are provided by lines BA0 through BA7 of the buffered address lines. Outputs terminal Q1 provides an input to inverter 304 which in turn provides one input to OR gate 306. Output terminals Q3 and Q4 of array 301 provides signals PATSEL0 and PATSEL1 mentioned earlier. Output terminal Q5 provides a signal which serves as one input to AND gate 305 whose other input is provided by signal CLKD— and whose output is signal SCLK—, providing a signal to the wand interface 32.

Output terminals Q6 through Q8 provide bias 0 through bias 2, respectively, for the bias PROM 26, described above.

The output of OR gate 306 is buffered through buffer 307 and provides signal WE—. Buffer 308 provides the output signal MEMEN—; buffers 307 and 308 having their outputs controlled by signal UBSY. Signals WE— and MEMEN— are input to microprocessor 11.

NAND gates 252 and 253 form a latch with signal WED— providing one input to NAND gate 252 and signal URST— providing one input to NAND gate 253 whose respective outputs provide the other inputs. AND gate 251 has signal HOLDA from microprocessor 11 as one input and the output from NAND gate 252 providing the other input. The output of AND gate 251 provides the set input on terminal D of flip flop 254. The Q output of flip flop 254 provides signal UBSY to the D input of flip flop 255. The Q output of flip flop 255 is one input to NAND gate 261. Another input to NAND gate 261 is signal PATFND—. The signal CLK-clocks both of flip flops 254 and 255, is inverted through inverter 260 and provides an input to NAND gate 261 and also an input to NAND gate 259. The output of NAND gate 261 provides signal CLKD—, mentioned earlier. NAND gate 259 has another input provided by the Q output of flip flop 255 and has still another input provided by signal PATFND. The output of NAND gate 259 provides one input to NAND gate 257. OR gate 256 has one input provided by the Q— output of flip flop 255 and the other input provided by signal CNTEQ0—, as mentioned earlier. The output from OR gate 256 provides a third input to NAND gate 257 whose output signal URST is inverted through inverter 258, providing output signal URST—, also mentioned earlier.

FIGS. 7a through 7k are a map of the contents of the program ROM 15 which controls the microprocessor 11. The map is coded hexidecimal and illustrates what each bit in the ROM is, that is, whether it is a "1" or a "0." Thus, the entire operation of the microprocessor 11 is defined by the code shown in these FIGS. 7a through 7k.

Having described the circuitry, the operation shall now be described.

MODE OF OPERATION

Figure 8A:
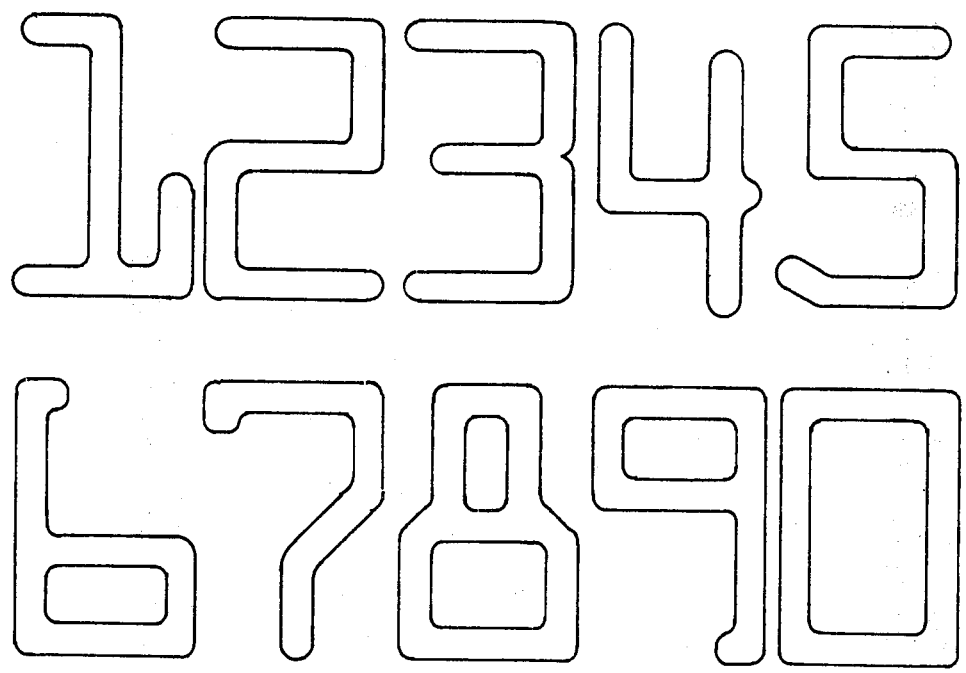
FIGS. 8a-8c illustrate the character set used in this embodiment of the invention.
Figure 8B:
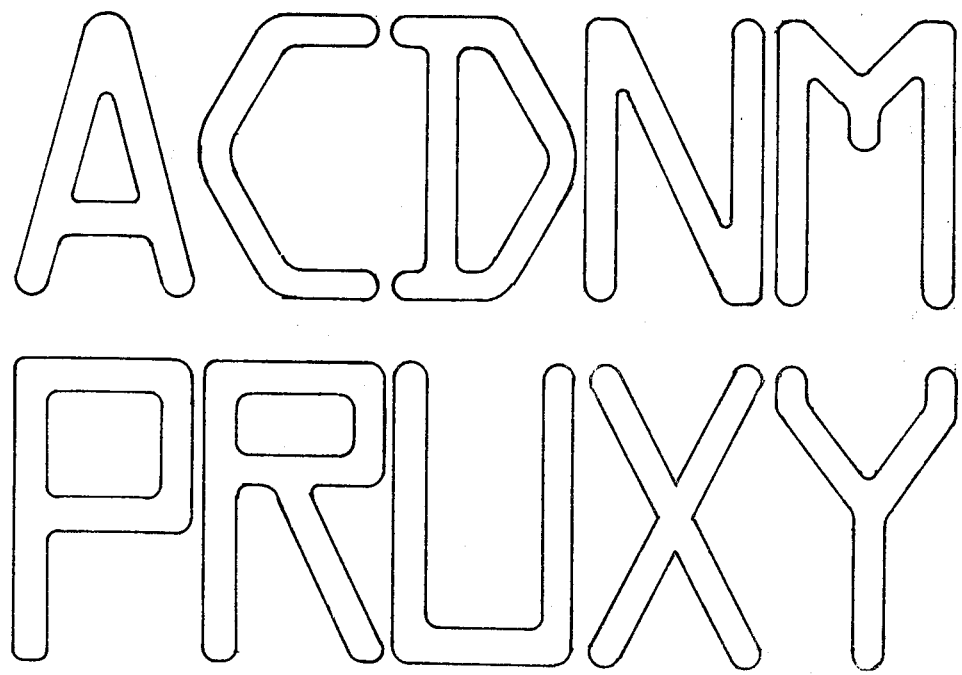
Figure 8C:
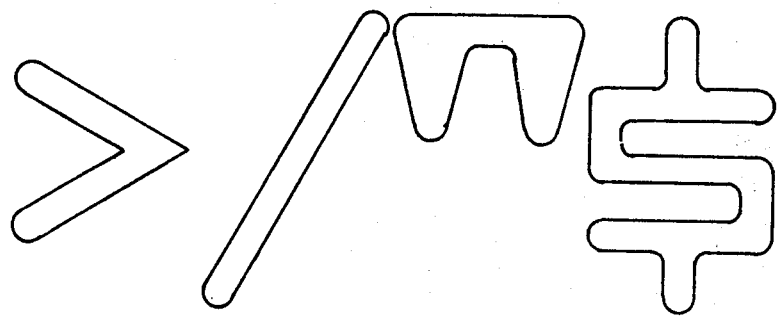

FIGS. 8a through 8c show the character set used by the National Retail Merchants Association for the price tag to be read.

Figure 9:
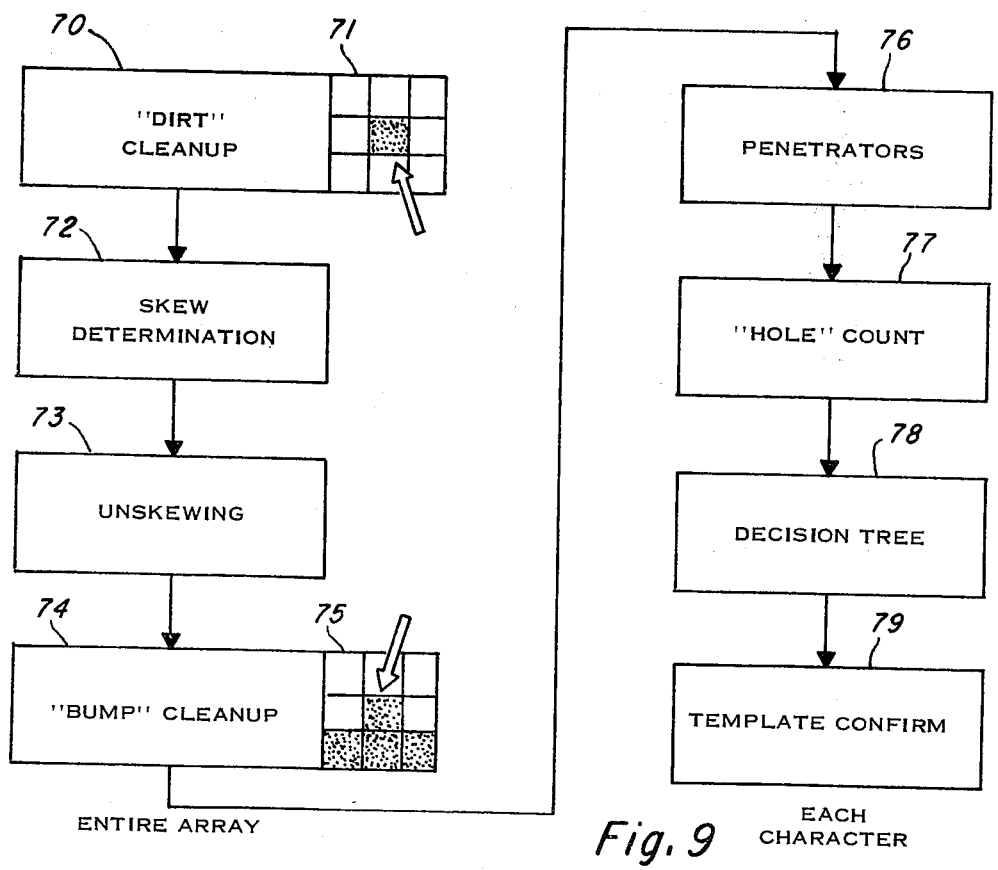
FIG. 9 is a flowchart of the operation of the circuitry of this invention.

FIG. 9 is a flowchart of the operation of the circuitry described in detail in the preceding section of this specification. Clock 70 indicates a "dirt" clean-up with block 71 illustrating what is done. Under the control of microprocessor 11, microcontroller 25 and its associated circuitry is directed to scan the contents of image memory 17, looking for isolated black pixels as indicated by the arrow in block 71. That is, a transition is noted and the black pixels are counted in shift register 291. If there is only one black pixel, it is changed from "1" to a "0," thus removing extraneous matter.

Figure 11:
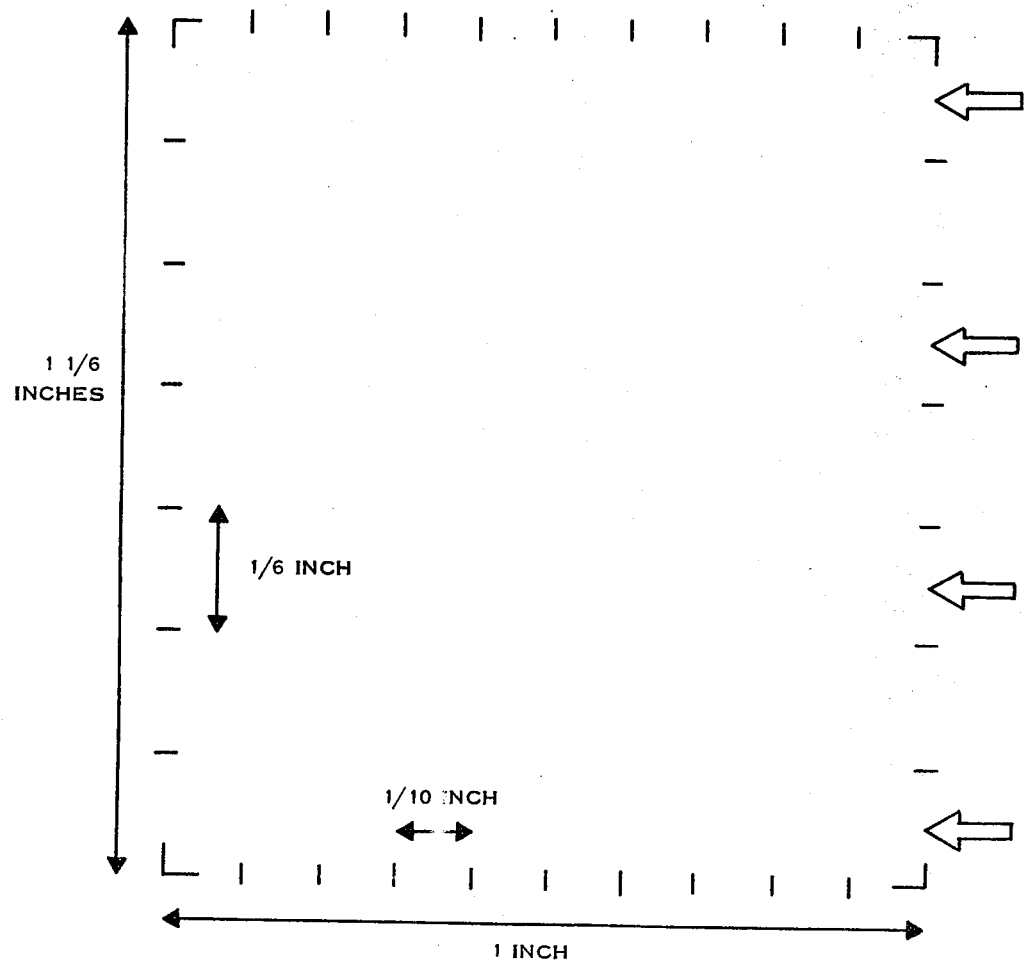
FIG. 11 illustrates the National Retail Merchants Association (NRMA) price tag format in which the unknown characters are found.

Next, at block 72, a skew determination is indicated. The industry format for the tags is shown in FIG. 11. The absolute maximum information content is 40 characters displayed in a field measuring 1 1/6" high by 1" wide. The unit cell for each character is 1/6" high by 1/10" wide, yielding a 5:3 aspect ratio.

The choice of the CCD imager array size and pixel aspect ratio is dictated by several considerations. First, it is desirable to have the total pixel count be less than 16,384 so that it will fit into a 16K RAM, namely the image RAM 17. A CCD array of 112 vertical by 144 horizontal pixels, (16128 pixels) with a single cell aspect ratio of 3:2, was selected.

The industry specification for the skew parameter is plus or minus 2° from character to character, which for a 9×9 matrix is essentially 0. If the price tag is skewed in the field of view of the imager, all of the characters (and furthermore the base lines of each row of characters) are skewed by the same angle. A skew angle is readily determined by going from one character to the next. A simple row and column shifting operation is all that is required to deskew. That is, if the skew angle is $\tan^{-1} N/M$, then the Kth row should be shifted over by a number of cells equal to the integer quotient of KN divided by M, and likewise for the columns. The net result of this operation is a slight magnification of the character along one axis and a demagnification along the other. If, however, this effect is less than one unit cell in magnitude (as is usually the case except for very severe skew angles) then the binary quantization of data supresses this effect entirely. The deskewing is indicated at block 73.

Figure 10:
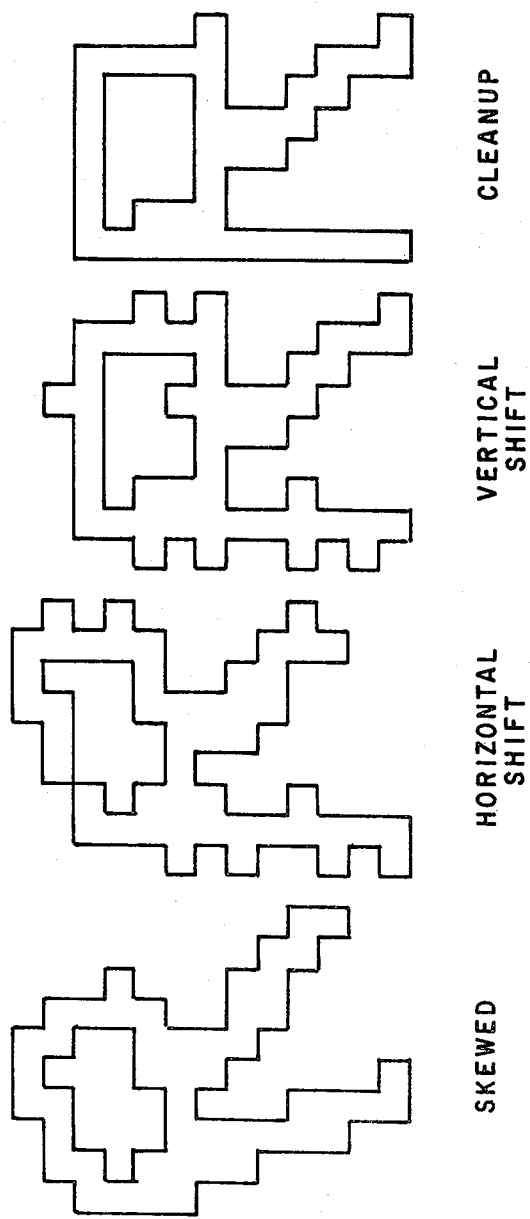
FIG. 10 illustrates a skewed character being deskewed and having its "bumps" removed.

FIG. 10 indicates an "R" having being skewed and deskewed by horizontal and vertical shifts finally having been cleaned up. A recognizable "R" is the result.

Block 74 indicates a "bump" clean-up as shown in block 75 at the arrow. That is, any protrusions on letters are changed from "1s" to "0s."

Figure 12:
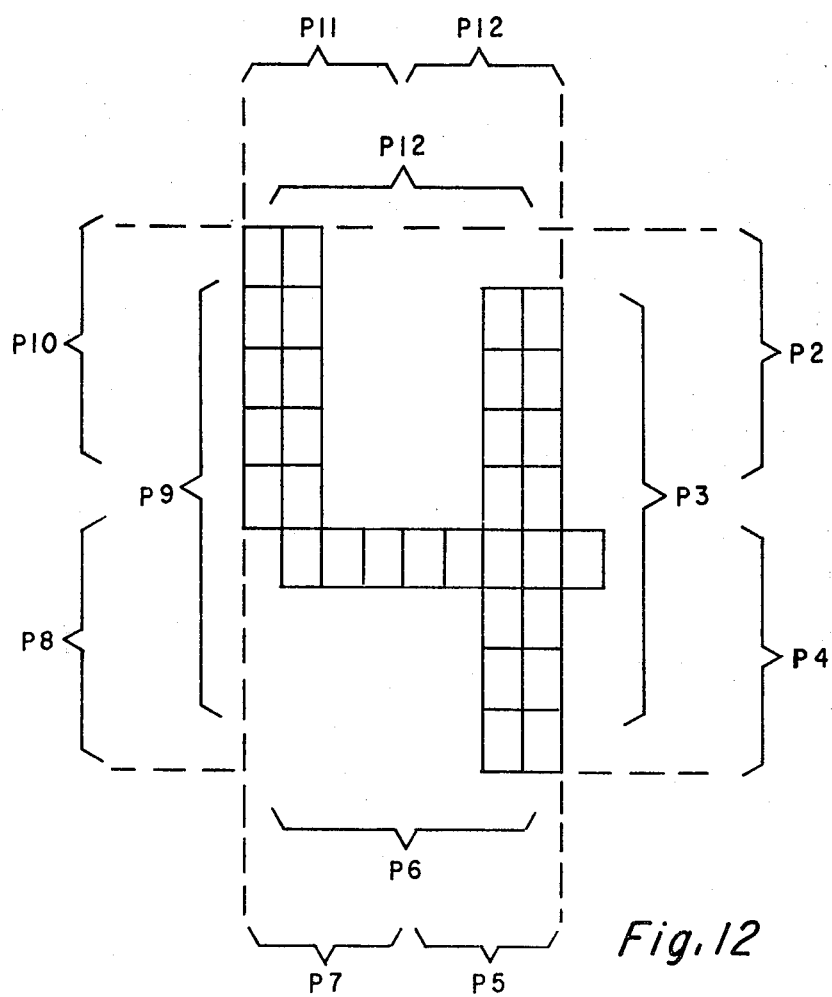
FIG. 12 illustrates the penetration designations.

Next, as indicated at block 76, penetrators are employed to categorize the unknown character. Referring to FIG. 12, the various penetrators are shown with the right and left entire size being indicated as penetrators P3 and P9 with the bottom being indicated P6 and the top indicator P12. Further broken down, the upper and lower penetrators for the right side are penetrators P2 and P4, while the upper and lower penetrators on the left side are penetrators P10 and P8. The right and left penetrators on the upper side are penetrators P1 and P11 and the right and left penetrators on the lower side are penetrators P5 and P7.

Figure 13:
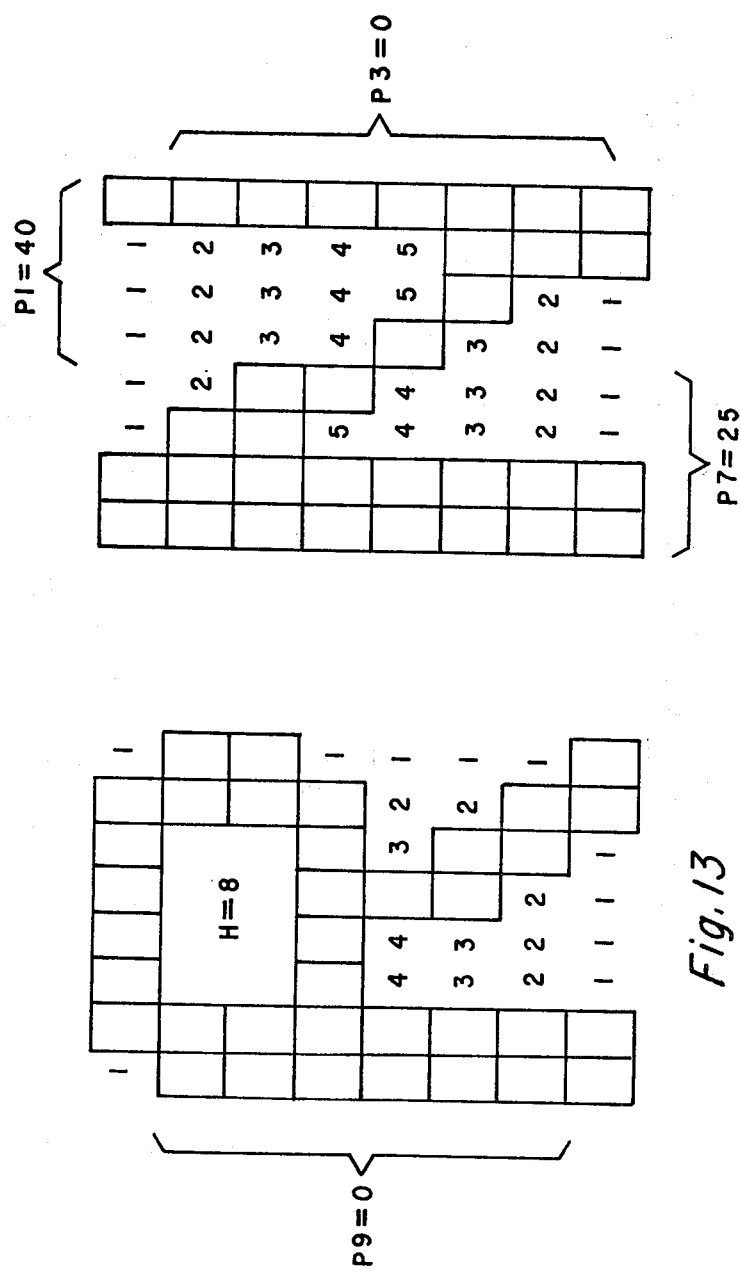
FIG. 13 illustrates the summing of pixels.

FIG. 13 illustrates the weighting of the pixels within a window that contains an unkown character. Note that the weighting is progressively increased from the outside portion to the inner portion of the letter. Where no penetration is made, the sum="0" as shown as the left hand side as P9=0. Otherwise, from the bottom, the penetration for the "R" indicates a total count for P6 as $1+2+3+4+1+2+3+4+1+2+1=24$. The hole counted within the black pixels is comprised of eight white pixels. It can therefore be seen that a number or character is readily identifiable. For example, #3 has a huge P9 and a P3, P6 and P12 that are virtually zero. In fact, the simple 16− way branch based on the broad window values P3, P6, P9 and P12 alone narrows the possibilities from 24 to 2 (best case) and 9 (worst case) characters.

Referring back to FIG. 9, the "hole" count indicated at block 77 is the counting of white pixels within the black character pixels. The decision tree at block 78 is the next step and a template confirm, at block 79, that is, confirming that a particular unknown character matches a particular known character within its categorization, follows.

Referring to FIG. 1, when the operator of the wand places the CCD imager against the price tag and pulls the trigger, a TRIG signal is applied to OCR buffer 33 and then to microprocessor 11 indicating that a tag is being read and the contents of the CCD imager should be loaded into RAM 17. This is accomplished by the microprocessor 11 instructing microcontroller 25 to down load RAM 17. Wand data comes into buffered address bus 22, through transceiver 21 into data bus 18 and into RAM 17. This down loading is accomplished very quickly.

Next, the memory contents are subject to the "dirt" clean-up mentioned earlier where a scan is made of the contents of RAM 17 by microcontroller 25 under the direction of microprocessor 11. That is, the memory is scanned until a black pixel is detected. If only one black pixel is detected, it is changed from a "1" to a "0."

The next step is to determine where the first line of characters is located. This is done by scanning the RAM image again. This time, the microprocessor 11 will set the pixel count at 50 so that the lower approximate half of the image is scanned rather than the entire image. That is, starting at address 0 in the lower left hand corner of the image, pixels are counted through address 49. The search is again started at address 112 going up 50 pixels and then restarted at address 224 and so on. When a black transition occurs, the black pixels are counted. If four out of eight pixels are black, it is presumed that a character has been detected. The next character in the line is detected in this same manner until all the characters have been detected. Actually the character is unknown and at this time only the bottoms of the characters have actually been detected, providing the skew angle, if any. Then the deskewing operation is performed, Next, the actual characters must be entirely detected and identified. This is done by again looking for the character with four out of eight black pixels indicating a character. The unknown character is boxed in by addressing each of the corners, knowing how large a character should be and again using the pattern search pixel counter and event counter as required.

After having boxed in the character in a "window" the penetration technique is started. The categorization of each unknown character in the line is then made in the same manner as described earlier.

Th next line is reached by jumping to a point that is closed to the bottom of the next row of pixels as determined by the standards set for the price tag. The line is detected as below with the same operations being performed. The next two lines of characters are handled in exactly the same way. The character information is sent to RAM 16 for further processing. Microprocessor 11, under program control of ROM 15 then compares the categorized unknown character with the characters that it might be until a comparison is made. Then the contents of RAM 16 are sent to the OCR buffer 33, to the TRU buffer 34 and then on command into the TRU through interface 35.

One skilled in the art may make changes in the logic arrays without departing from the spirit and scope of the invention as defined in the appended claims.

I claim:

1. A method of character recognition of a character from a memory means arranged in columns and rows of pixels, comprising the steps of:
   (a) forming a window around an unknown character, the window being defined by the memory addresses of at least two of the corners;
   (b) assigning a weight number to each pixel within the window;
   (c) penetrating the window by counting pixels inwardly from each side for predetermining rows, and from top and bottom of the window for predetermined columns until a transition from white (0) to black (1) occurs;
   (d) summing the white pixel weight numbers for each penetration until the transition occurs to form a sum for the total number of penetrations from each side and from top and bottom of the window;
   (e) combining the sums;
   (f) categorizing the combination;
   (g) identifying the possible characters from the categorization; and
   (h) comparing the possible characters from the categorization with the unknown character until a match is made.

2. A method of character recognition of a character from a memory means arranged in columns and rows of pixels, comprising the steps of:
   (a) forming a window around an unknown character, the window being defined by the memory addresses of at least two of the corners;
   (b) assigning a weight number to each pixel within the window;
   (c) penetrating the window by counting pixels inwardly from each side for predeterined rows, and from top and bottom of the window for predetermined columns until a transistion from white (0) to black (1) occurs;
   (d) summing the white pixel weight numbers for each penetration until the transition occurs to form a sum for the total number of penetrations from each side and from top and bottom of the window;
   (e) forming a sum for the upper and lower portion of each side of the window, and forming a sum for the left and right portion of the top and bottom of the window;
   (f) combining the sums;
   (g) categorizing the combination;
   (h) identifying the possible characters from the categorization; and
   (i) comparing the possible characters from the categorization with the unknown character unitl a match is made.

3. A method of character recognition of a character from a memory means arranged in columns and rows of pixels, comprising the steps of:
   (a) forming a window around an unknown character, the window being defined by the memory addresses of at least two of the corners;
   (b) assigning a weight number to each pixel within the window;
   (c) penetrating the window by counting pixels inwardly from each side for predetermined rows, and from top and bottom of the window for predetermined columns until a transition from white (0) to black (1) occurs;
   (d) counting white pixels following a transition from white to black to white until a transition from white to black occurs;
   (e) summing the white pixel weight numbers for each penetration until the transition occurs to form a sum for the total number of penetrations from each side and from top and bottom of the window;
   (f) combining the sums;
   (g) categorizing the combination; and
   (h) identifying the possible characters from the categorization.

4. A method of character recognition of a character from a memory means arranged in columns and rows of pixels, comprising the steps of:
   (a) forming a window around an unknown character, the window being defined by the memory addresses of at least two of the corners;
   (b) assigning a weight number to each pixel within the window;
   (c) penetrating the window by counting pixels inwardly from each side for predetermined rows, and from top and bottom of the window for predetermined columns until a transition from white (0) to black (1) occurs;
   (d) counting white pixels following a transition from white to black to white until a transition from white to black occurs;
   (e) summing the white pixel weight numbers for each penetration until the transition occurs to form a sum for the total number of penetrations from each side and from top and bottom of the window;
   (f) forming a sum for the upper and lower portion of each side of the window, and forming a sum for the left and right portion of the top and bottom of the window;
   (g) combining the sums;
   (h) categorizing the combination; and
   (i) identifying the possible characters from the categorization.

5. The method of claim 4 including the further step, after step (g), of comparing the possible characters from the categorization with the unknown character until a match is made.

6. A method of character recognition of a plurality of parallel lines of unknown characters from a memory means arranged in columns and rows of pixels comprising the steps of:
   (a) locating the first line of unknown characters;
   (b) determining the skew of the line;
   (c) deskewing the line;
   (d) locating the first unknown character in the line;
   (e) forming a window around an unknown character, the window being defined by the memory addresses of at least two of the corners;
   (f) assigning a weight number to each pixel within the window;
   (g) penetrating the window by counting pixels inwardly from each side for predetermined rows, and top and bottom of the window for predetermined columns until a transition from white (0) to black (1) occurs;

(h) summing the white pixel weight numbers for each penetration until the transition occurs to form a sum for the total number of penetrations from each side, and from top and bottom of the window;

(j) combining the sums;

(k) categorizing the combination;

(l) identifying the possible characters from the categorization;

(m) locating the next unknown character in the line; and (n) repeating steps (e) through (m) through the last unknown character in the line.

7. The method of claim 6 including the further steps, after step (n), of:

(o) locating the next line of unknown characters; and (p) repeating steps (c) through (n) through the last line of unknown characters.

8. The method of claim 7 including the further step, after step (h) of forming a sum for the upper and lower portion of each side of the window, and forming a sum for the left and right portion of the top and bottom of the window.

9. The method of claim 8 including the further step, after step (l) of comparing the possible characters from the categorization with the unknown character until a match is made.

10. The method of claim 9 including the further step, after step (g) of counting white pixels following a transition from white to black to white until a transition from white to black occurs.

11. The method of claim 7, including the further step, after step (l) of comparing the possible character from the categorization with the unknown character until a match is made.

12. The method of claim 7 including the further step, after step (g) of counting white pixels following a transition from white to black to white until a transition from white to black occurs.

13. The method of claim 6 including the further step, after step (h) of forming a sum for the upper and lower portion of each side of the window, and forming a sum for the left and right portion of the top and bottom of the window.

14. The method of claim 10 including the further step, after step (l) of comparing the possible characters from the categorization with the unknown character until a match is made.

15. The method of claim 14 including the further step, after step (g) of counting white pixels following a transition from white to-black to white until a transition from white to black occurs.

16. The method of claim 6 including the further step, after step (l) of comparing the possible characters from the categorization with the unknown character until a match is made.

17. The method of claim 6 including the further step, after step (g) of counting white pixels following a transition from white to black to white until a transition from white to black occurs.

* * * * *